(12) United States Patent
Savran et al.

(10) Patent No.: US 8,919,840 B2
(45) Date of Patent: Dec. 30, 2014

(54) MECHANICAL GRIPPER FOR MANIPULATION OF MICRO-SIZED OBJECTS

(71) Applicant: Purdue Research Foundation, West Lafayette, IN (US)

(72) Inventors: Cagri Savran, West Lafayette, IN (US); Farrukh Mateen, Islamabad (PK); Bin-Da Chan, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 2 days.

(21) Appl. No.: 13/682,922

(22) Filed: Nov. 21, 2012

(65) Prior Publication Data

US 2013/0154292 A1    Jun. 20, 2013

Related U.S. Application Data

(60) Provisional application No. 61/562,803, filed on Nov. 22, 2011.

(51) Int. Cl.
| | | |
|---|---|---|
| *B25J 7/00* | (2006.01) | |
| *B25J 15/00* | (2006.01) | |
| *B25J 15/06* | (2006.01) | |
| *B25J 15/12* | (2006.01) | |

(52) U.S. Cl.
CPC .............. *B25J 7/00* (2013.01); *B25J 15/0071* (2013.01); *B25J 15/0616* (2013.01); *B25J 15/12* (2013.01)
USPC ........................................ 294/100; 294/86.4

(58) Field of Classification Search
USPC ................. 294/99.1, 100, 86.4; 33/813–831; 977/962
See application file for complete search history.

(56) References Cited

U.S. PATENT DOCUMENTS

| | | | | |
|---|---|---|---|---|
| 4,139,948 | A | * | 2/1979 | Tsuchiya et al. ............. 359/391 |
| 4,787,148 | A | * | 11/1988 | Myer .............................. 33/814 |
| 5,046,773 | A | * | 9/1991 | Modesitt ........................ 294/100 |
| 5,163,728 | A | * | 11/1992 | Miller et al. ................. 294/99.1 |
| 5,458,388 | A | * | 10/1995 | Danek et al. .................. 294/100 |
| 5,727,915 | A | * | 3/1998 | Suzuki .............................. 414/1 |
| 5,895,084 | A | * | 4/1999 | Mauro ........................... 294/100 |
| 7,083,210 | B2 | * | 8/2006 | Muramatsu et al. .......... 294/100 |
| 7,431,364 | B2 | * | 10/2008 | Huang et al. ................. 294/99.1 |
| 7,770,951 | B2 | * | 8/2010 | Shin et al. .................... 294/86.4 |
| 2004/0212206 | A1 | * | 10/2004 | Chang et al. ................. 294/99.1 |

* cited by examiner

*Primary Examiner* — Dean Kramer
(74) *Attorney, Agent, or Firm* — Purdue Research Foundation

(57) ABSTRACT

An apparatus for the micromanipulation of micro-sized objects includes a micromanipulation device in the form of a hollow frame having a base, resiliently deflectable arms projecting from the base and defining a gap for receiving a micro-sized object, and a saddle connected to the tips of the arms between the base and the tips. A force generating device applies a force to the saddle to deflect the tips inwards to close the gap about the micro-sized object. A fixture is provided for supporting the micromanipulation device and force generating device. The force generating device can be a micrometer. The micromanipulation device is configured for production using micro-fabrication techniques. The micromanipulation device may include a piercing element for piercing an object positioned between the arms of the device, and may further include a notch aligned with the piercing element for retaining the object.

34 Claims, 12 Drawing Sheets

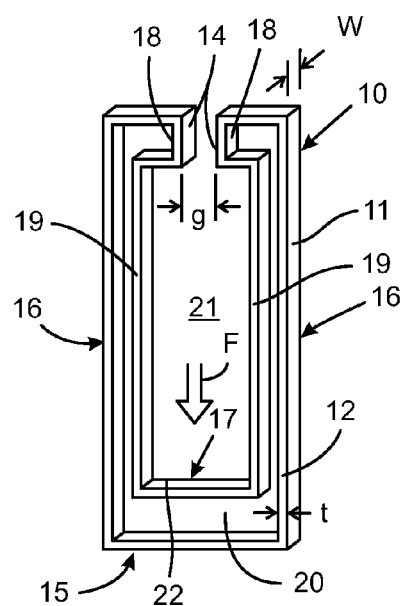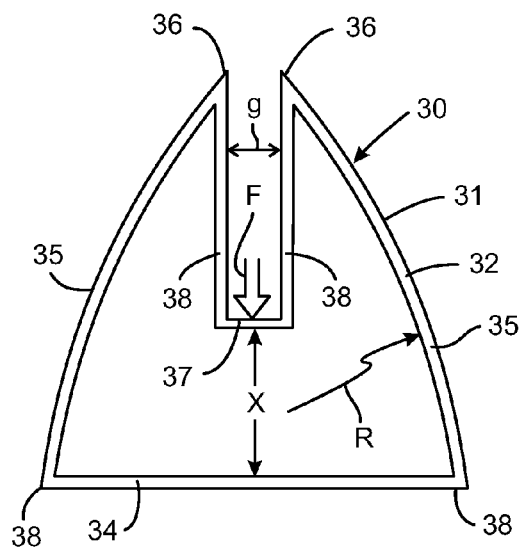
FIG. 2　　FIG. 3
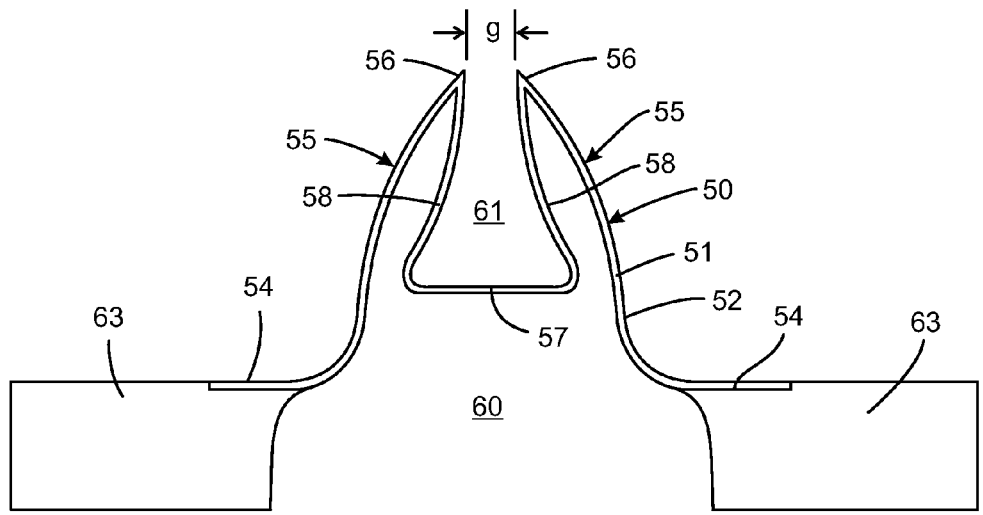
FIG. 6

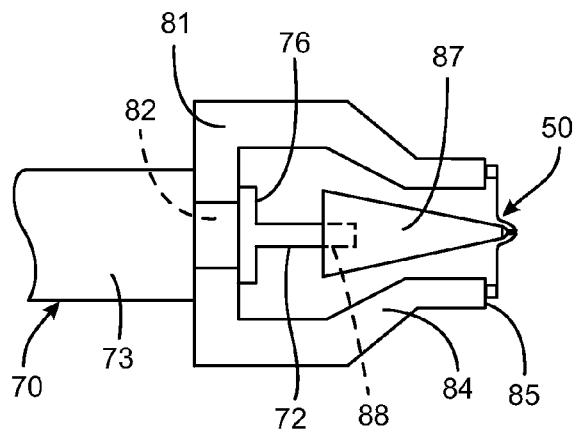
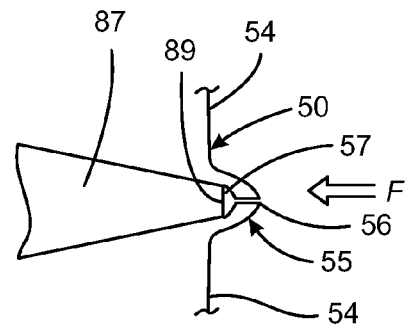
FIG. 9  FIG. 10
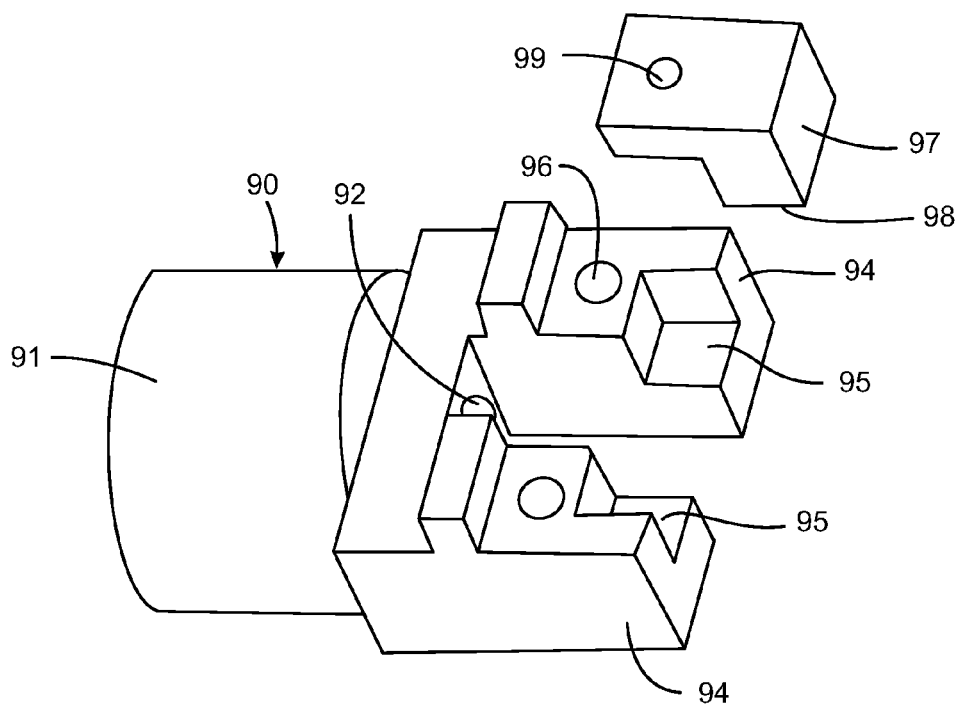
FIG. 11

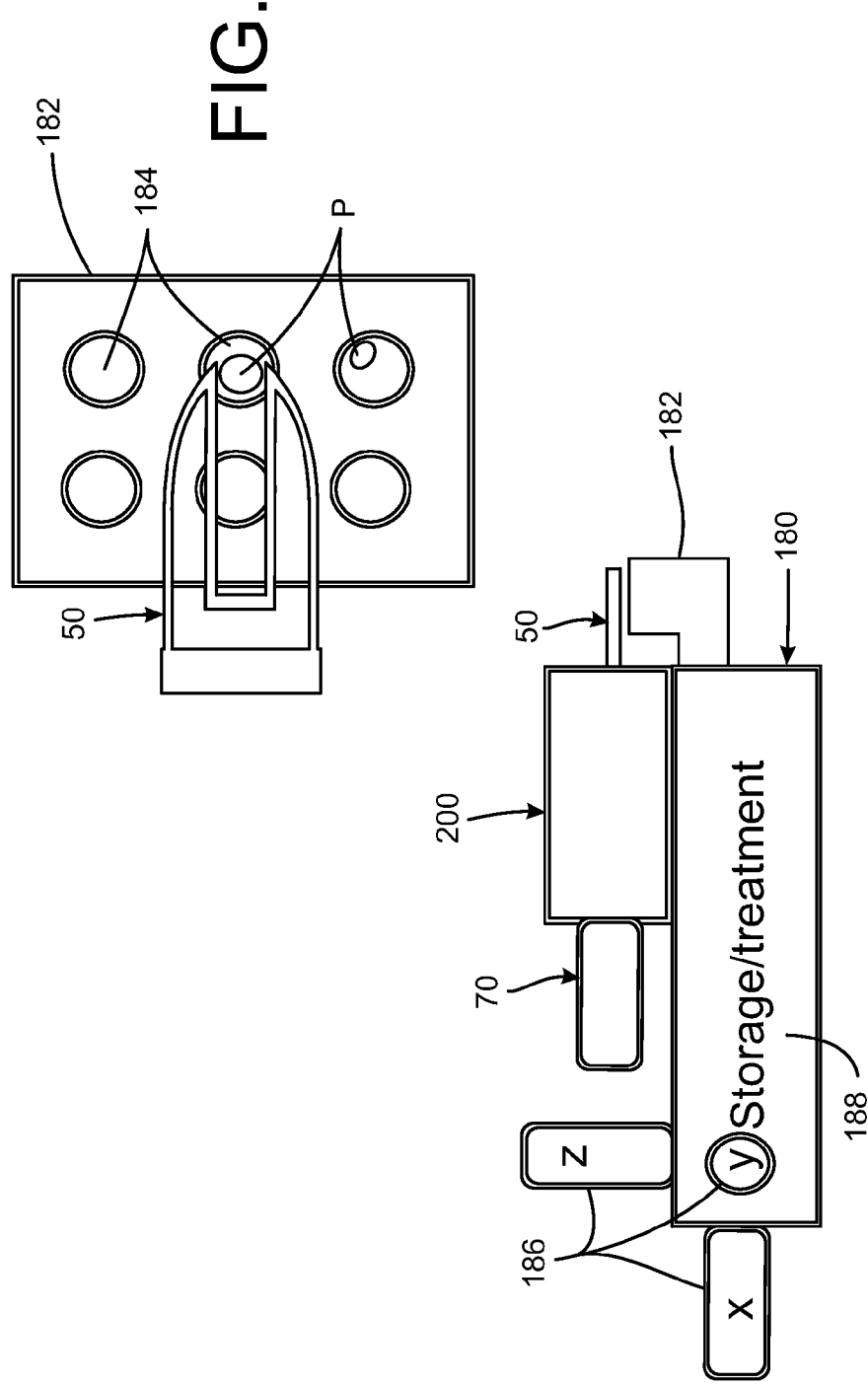

MECHANICAL GRIPPER FOR MANIPULATION OF MICRO-SIZED OBJECTS

PRIORITY CLAIM

This application claims priority to co-pending provisional application No. 61/562,803, filed on Nov. 22, 2011, the entire disclosure, including appendices, of which is incorporated herein by reference.

This invention was made with government support under EY018230 awarded by the National Institutes of Health. The Government has certain rights in the invention.

FIELD OF THE INVENTION

The present invention relates generally to mechanical grippers, and more particularly, to mechanical grippers for manipulation of single micro-particles.

BACKGROUND

The ability to precisely target and position single particles has numerous applications including particle-by-particle assembly of larger microstructures as well as probing and manipulation of tissues, groups of cells and single cells. There is a growing need for simple, cost-effective and robust systems that can manipulate single micro-particles in many scientific fields ranging from micro/nanotechnology to biology. Most existing particle manipulation or gripping systems found in literature require relatively expensive and complicated fabrication and instrumentation steps that significantly reduce the robustness and reproducibility in operation. Hence, many of these systems have not enjoyed wide acceptance.

Researchers have developed gripping systems that are based on piezoelectric effect to produce elastic deformation of a structure upon the application of sufficient voltage. See e.g., Basrour, S., Robert, L., 1997, "Mechanical characterization of micro-grippers realized by LIGA technique," 1997 International Conference on Solid-state Sensors and Actuators, Vol. 1, pp. 599-602; Tan, K. K., Ng, S. C., 2001, "Computer controlled piezo micromanipulation system for biomedical applications," Engineering and science journal, Vol. 10, pp. 249-256; Eisinberg, A., Houston, K., Caparrelli, P., Amavasai, B., Boissenin, M., 2006, "Marking techniques for vision recognition of microgrippers for micromanipulation," Proceedings of the 2006 IEEE International Conference on Robotics and Automation, pp. 1030-1035; Ferreira, A., Agnus, J., Chaillet, N., Breguet, J., 2004, "A Smart Microrobot on Chip: Design, Identification, and Control," IEEE/ASME Transactions on Mechatronics, Vol. 9, No. 3; Agnus, J., Nectoux, P., Chaillet, N., 2005, "Overview of Micro-grippers and Design of a Micromanipulation Station Based on a MMOC Micro-gripper," Proceedings 2005 IEEE International Symposium on Computational Intelligence in Robotics and Automation, pp. 117-123; Grossard, M., Rotinat-Libersa, C., Chaillet, N., 2007, "Redesign of the MMOC microgripper piezoactuator using a new topological optimization method," 2007 IEEE/ASME International conference on advanced intelligent mechatronics, pp. 1-6; and Bliderana, M. M., Fleischera, M., Grauvogelb, F., Löfflerb, K., Langerb, M. G., Kerna, D. P., 2008, "Real-time gripping detection for a mechanically actuated microgripper," Microelectronic Engineering In Press 2008.

For example, Jericho et al. developed a piezoelectric MEMS micro-tweezers for the manipulation of micro-objects. See, Jericho, S. K., Jericho, M. H., 2004, "Micro-electra-mechanical systems micro-tweezers for the manipulation of bacteria and small particles," Review of Scientific Instruments, Vol. 75, No. 5. As shown in FIG. 1a, the gripping parts of this tweezers consist of short bars with a cross-section of 2 μm×2 μm. The tweezers tips have a 15 μm rest opening and require about 70V for full closing. Since voltage control on the order of 1 to 2 volts is easily achieved, clamping forces as low as a few hundred nano-newtons can be obtained. The tweezers are activated by a 2 μm×2 mm long polysilicon bar that is coupled to a piezoelectric strip actuator by a thin aluminum rod.

Henein et al. present a high precision flexible micro-tweezers designed for micro-objects, as depicted in FIG. 1b. See, Henein, S., 2001, "Flexible Micro-Gripper for Micro-Factory Robots," Conception des guidages flexibles, Presses Polytechniques et Universitaires Romandes. The piezoelectric effect is used to actuate flexure hinges which produce symmetric parallel movement of the gripping jaws. The device is fabricated using Electro-Discharge Machining (EDM). Piezo-resistive force sensors are used to measure the force being imparted on the object manipulated.

Carrozzay et al. disclose a lithography fabricated microtweezers, as shown in FIG. 1c. See, Carrozzay, M C., Menciassi, A., Tiezzi, G., Dario, P., 1998, "The development of a LIGA-microfabricated gripper for micromanipulation tasks," Journal of Micromechanics and Microengineering, Vol. 8, No. 2. The device works by the application of piezoelectric actuating force to the external thin beams while the internal beams are rigidly constrained to produce rotation and translation at the tips of the tweezers to close them.

Park et al. developed a gripping device with the three chop stick design shown in FIG. 1d. See, Park, J., Moon, W., 2005, "The systematic design and fabrication of a three-chopstick microgripper," International Journal of Advanced Manufacturing Technology, Vol. 26, pp. 251-261. Two of the sticks grip the micro-object while the third is used for hold and release functions. The stack and bender actuators are both piezoelectric actuators. The piezoelectric bender is used to actuate the two outside prongs, while the middle prong is actuated by the piezoelectric stack in the opposite direction to the other two. The chop sticks are made out of tungsten using Electro-Discharge Machining and precision micro-assembly. This device is intended for objects about 100 μm in size; hence the gap between the fingers is also 100 μm.

Most commonly used piezoelectric actuators usually need high activation voltages of around 60-70V. Since they can only produce a few microns of displacement, multilayers of actuators or multiple actuators are needed. This significantly increases the complexity of the microfabrication process, which results in devices that are expensive and hard to reproduce (both in terms of fabrication and operation).

Researchers have also explored the use of thermal actuation within gripping devices. See Honnatti, M., Hughes, G., "Directed Cellular Manipulation Using Polymer Microgrippers," Zyvex Instruments; Bordatchev, E. V., Nikumb, S. K., 2005, "Electro-thermally driven microgrippers for micro-electro-mechanical systems applications," Journal of Microlithography, Microfabrication, Microsystems. Vol. 4; Suzuki, Y., 1994, "Fabrication and evaluation of flexible microgripper," Japan Journal of Applied Physics. Vol. 33, pp. 2107-2112; Molhave, K., Hansen, O., 2005, "Electro-thermally actuated microgrippers with integrated force-feedback." Journal of Micromechanics and Microengineering. Vol. 15, pp. 1265-1270; Du, H., Su, C., Lim, M. K, Jin, W. L., 1999, "A micromachined thermally-driven gripper: a numerical and experimental study," Smart Materials and Structures.

Vol. 8, pp. 616-622; Volland, B. E., Ivanova, K., Ivanov, T., Sarov, Y., Guliyev, E., Persaud, A., Zöllner, J. P., Klett, S., Kostic, I., Rangelow, I. W., 2007, "Duo-action electro thermal micro gripper," *Proceedings of the 32nd International Conference on Micro- and Nano-Engineering.* Vol. 84, pp. 1329-1332; Andersen, K. N., Carlson, K., Petersen, D. H., Mølhave, K., Eichhorn, V., Fatikow, S., Bøggild, P., 2008, "Electrothermal microgrippers for pick-and-place operations," *Microelectronic Engineering In Press* 2008; Fraser, J., Hubbard, T., Kujath, M., 2006, "Theoretical and experimental analysis of an off-chip microgripper," *Canadian Journal of Electrical and Computer Engineering,* Vol. 31, No. 2. These devices rely on localized changes in temperature for actuation. A few of these studies are summarized below.

Wang et al. describe the architecture of a three-probe MEMS nanomanipulator with nano-scale end effectors. See, Wang, X, Vincent, L., Yu, M., Huang, Y., Liu, c., 2003, "Architecture of a Three-Probe MEMS Nanomanipulator with Nanoscale End-Effectors," *Proceedings of the* 2003 *IEEE/ASME International Conference on Advanced Intelligent Mechatronics.* Micromachining and nanofabrication techniques are employed in the fabrication of this device. Unlike the micro-tweezers discussed before which can manipulate objects in the micron range, this device shown in FIG. 1e is capable of picking up nano-scale objects such as carbon nanotube structures having an average diameter of 1 nm. Each probe beam is 300 µm long with nano end-effectors. The actuation is achieved by increasing the temperature at the interface of the "actuator" metal and the silicon nitride cantilever, by means of a voltage application. Due to unequal expansion of the silicon nitride and silicon, the cantilever displaces from its position as shown in FIG. 1e.

Another thermally actuated device was developed by Nguyen et al. See, Nguyen, N., Ro, S., Low, Lee-Ngo, C., 2004, "A polymeric microgripper with integrated thermal actuators," *Journal of Micromechanics and Microengineering,* Vol. 14, pp. 969-974. This micro-tweezers was fabricated using a polymeric surface micromachining process, which utilized 100 µm thick SU-8 deposited and patterned over silicon. A stencil wafer was fabricated using deep reactive ion etching to define heating pads. Another thermally actuated micro gripper was developed by Ivanova et al. that was fabricated from single crystal bulk silicon. See, Ivanova, K., Ivanov, T., Badar, A., Volland, B. E., 2006, "Thermally driven microgripper as a tool for micro assembly," *Microelectronic Engineering,* Vol. 83, pp. 1393-1395. The gripper employs thermally grown oxide as an insulating layer on a single crystal silicon substrate with a layer of (Cr/Au) deposited on top of the oxide. Current passes through hot arms of the device to cause Joule heating. A cold arm is shorter and wider than the hot arm hence so that the short arm does not heat up at the same rate. This difference in heating causes a torque at the tips which closes the device. Chronis et al. developed another SU-8-based, thermally actuated micro-tweezers that uses a similar hot and cold arm arrangement. See, Chronis, N, Lee, L. P., 2005, "Electrothermally Activated SU-8 Microgripper for Single Cell Manipulation in Solution," *Journal of Microelectromechanical systems,* Vol. 14, No. 4, pp. 857-863.

Researchers have also developed micro-grippers based on electrostatic actuation. See e.g., Millet, O., Bemardoni, P., Régnier, S., Bidaud, P., 2004, "Electrostatic actuated micro gripper using an amplification mechanism," *Sensors and Actuators,* Vol. 114, pp. 371-378; Kim, Chang-Jin, Pisano, A. P., Muller, R. S., 1992, "Silicon-Processed Overhanging Microgripper," *Journal of Microelectromechanical Systems,* Vol. I, No. I; Neild, A., Oberti, S., Beyeler, F., Dual, J., Nelson, B. J., 2006, "A micro-particle positioning technique combining an ultrasonic manipulator and a microgripper," *Journal of Micromechanics and Microengineering,* Vol. 16, pp. 1562-1570; Almeida, V. A. L. de., 2004, "Microgrippers Driven by Electrostatic Comb Drive Actuators," *ABCM Symposium series in Mechatronics,* Vol. 1, pp. 682-687; and Volland, B. E., 2002, "Electrostatically driven microgripper," *Microelectronic Engineering,* Vol. 61, pp. 1015-1023. Volland et al. fabricated an electrostatically actuated micro-gripper using silicon-on-insulator wafers. See, Volland, B. E., Heerlein, H., Rangelow, L W., 2002, "Electrostatically driven microgripper," *Microelectronic Engineering,* Vol. 61, pp. 1015-1023. The gripper, depicted in FIG. 1f has an electrostatically driven micro-actuator which generates a linear motion that is converted to rotational (gripping) motion by a hinge system. The tweezers opening is 170 µm while the length of the tweezers prongs is 1 mm. The actuation mechanism for this device is shown in the detail view of FIG. 1g.

Electro-static actuators are less frequently employed in micro-gripper devices than piezoelectric or electro-thermal actuators. One reason is their inherent limitation of operation in liquid. Comb drives which are the driving forces for most electrostatic actuators require an intricate and complex fabrication process. These drives are susceptible to dust contamination and comb misalignment and failure. Like piezoelectric and thermally-actuated devices, they also cannot act as standalone devices due to their external power requirement.

Another actuation method studied to a lesser extent in micro-gripping systems is pneumatic actuation. Pneumatically actuated devices make use of fluid pressure for mechanical actuation of gripper structures. See e.g., Butefisch, S., 2002, "Novel Micro-pneumatic actuator for MEMS," *Sensors and Actuators,* Vol. 97, pp. 638-645. In devices of this type, pressure applied through the capillary tubes to spring elements moves pistons, which actuate the gripper tips via intricately fabricated hinges Pneumatically actuated grippers suffer from some drawbacks, the biggest being the need for external equipment to provide the fluid pressure to actuate the mechanism. This poses an additional complexity in the fabrication which increases the cost of the device and reduces its reproducibility. In addition, the device can be incapacitated with a slight defect in the sealing. In such an event, the small geometry of this device can significantly hinder the troubleshooting.

Most of the prior micromanipulation device or micro-tweezers involve a large number of complex fabrication steps that not only add to the cost of the device but quite often render it too impractical to fabricate and/or use. Unlike fabrication of most macro-scale objects, a flaw in microfabrication can rarely be fixed without starting over. Furthermore, the actuation mechanisms of all existing systems require external power consumption which not only adds to operation costs but also requires additional instrumentation, such as power supplies and amplifiers. The overall complexity of these devices (both in fabrication, instrumentation and operation) has hampered the development and use of these devices so that they are not widely used in any industry.

There is a need for a micromanipulation device for grasping and manipulating micro-sized objects that can be easily manufactured on a micro-scale and that can be operated without the need for additional instrumentation.

SUMMARY

A micromanipulation assembly is provided for grasping and manipulating micro-sized objects, such as cells. The assembly includes a micromanipulation device in the form of a hollow frame structure having a pair of opposing resiliently deflectable arms and a saddle connected to the arms to deflect the arms toward each other upon application of a force to the saddle. The assembly further includes a force generating device, which in one embodiment is a micrometer that can generate a micro-controllable force simply by manual operation of the micrometer. A fixture is provided that supports the micromanipulation device and force generating device and that allows both devices to be easily removed and replaced. The fixture supports the two devices so that a force member of the micrometer (such as the spindle) can apply a force to the saddle.

In one feature, one arm of the micromanipulation device defines a notch for at least partially receiving a micro-sized object. The opposite arm includes a piercing element projecting toward the other arm and in alignment with the notch. The piercing element can thus pierce an object, such as a cell, captured within the notch. The piercing element may also be configured to deliver materials into the object being pierced. A suction tube may intersect the notch to apply a vacuum to help draw the object into the notch and retain the micro-sized object within the notch as it is being pierced.

BRIEF DESCRIPTION OF THE DRAWINGS

The above-mentioned and other advantages of the present invention, and the manner of obtaining them, will become more apparent and the invention itself will be better understood by reference to the following description of the embodiments of the invention taken in conjunction with the accompanying drawings, wherein:

FIG. 2 is a top perspective view of a micromanipulation device according to one disclosed embodiment.

FIG. 3 is a top view of a micromanipulation device according to another disclosed embodiment.

FIG. 6 is a top view of a micromanipulation device according to yet another disclosed embodiment.

FIG. 9 an enlarged top view of an assembled apparatus including the fixture and certain devices according to one disclosed embodiment.

FIG. 10 is an enlarged view of the interface between the force generating device and micromanipulation device.

FIG. 11 is a perspective view of a fixture according to another disclosed embodiment.

FIG. 22 is a schematic representation of an assembly according to a further disclosed embodiment including a storage/treatment module in combination with the micromanipulation apparatus.

FIG. 23 is an enlarged view of a multi-well platter of the module shown in FIG. 22, positioned beneath a micromanipulation device.

DETAILED DESCRIPTION

Figure 1A:
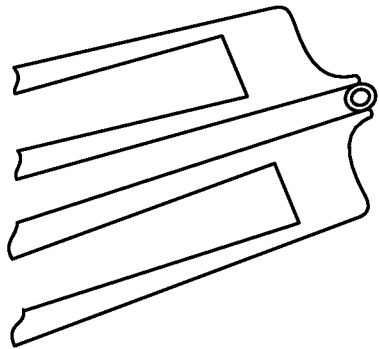
FIG. 1a shows a 5 μm diameter bead between the ends of a MEMS fabricated piezoelectric tweezers of the prior art.
Figure 1B:
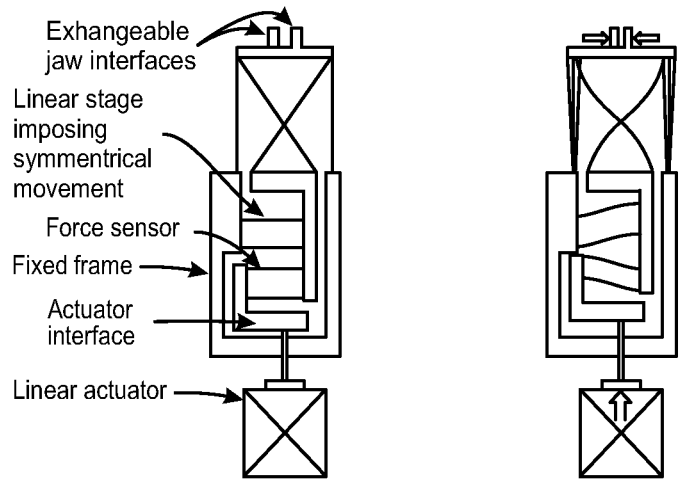
FIG. 1b shows a micro-gripper according to the prior art that employs a piezo-resistive force feedback sensor.
Figure 1C:
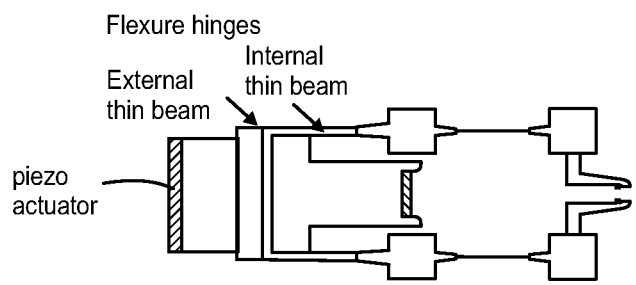
FIG. 1c shows lithography fabricated micro-gripper of the prior art in which external beams are pushed forward while internal beams are constrained, thus producing a rotation/translation at the tips which causes them to close.
Figure 1D:
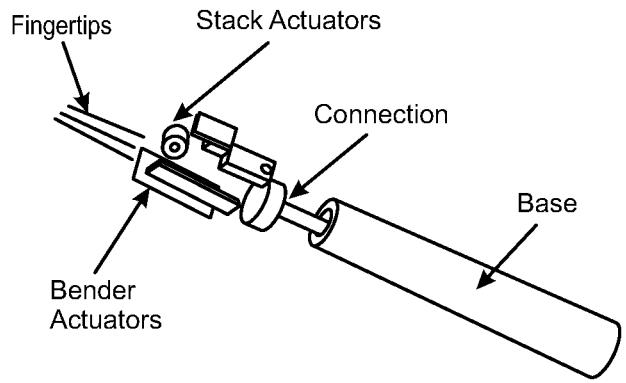
FIG. 1d shows a three chopstick micro-gripper of the prior art in which a piezobender operates two outer fingers while the middle finger is displaced in the opposite direction by the piezo-stack actuator.
Figure 1E:
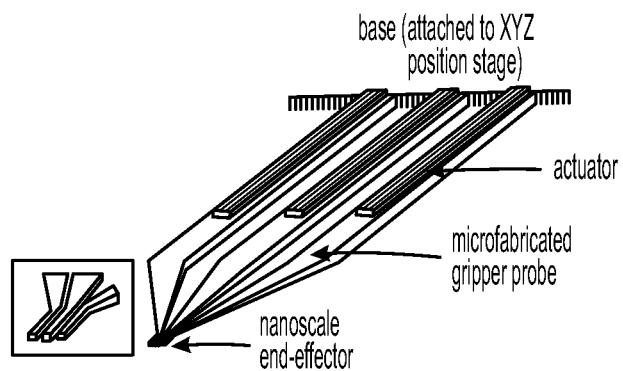
FIG. 1e shows the gripping action of a three probe tweezers with nano end-effectors of the prior art.
Figure 1F:
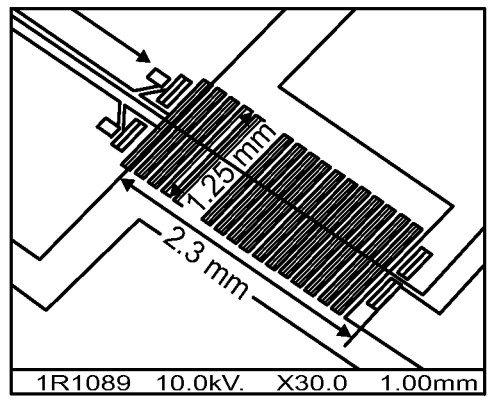
FIGS. 1f and 1g show an electrostatic micro-gripper of the prior art with a detail view of the flexible hinge structure of the device.
Figure 1G:
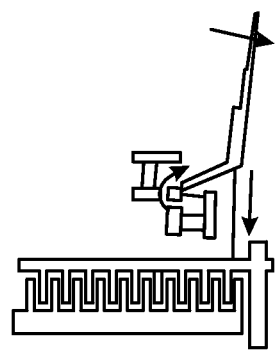

The embodiments of the present disclosure are not intended to be exhaustive or to limit the invention to the precise forms disclosed in the following detailed description. Rather, the embodiments are chosen and described so that others skilled in the art may appreciate and understand the principles and practices of the present invention.

In these teachings the design, fabrication and basic application of a device which is simple to operate, robust, cost effective, completely mechanical and manually actuated (no electrical power required) is described. The device can manipulate micro-objects of varying sizes. The device has a simple fabrication procedure and is made up of few parts for easy assembly. The following sections explain in detail the design, fabrication and application of a purely mechanical MEMS-based manipulator for micro-sized objects. In one embodiment a micromanipulation apparatus includes a compliant tweezers structure that is manually actuated via a micrometer. The apparatus described herein accommodates a two-arm system that can grab objects upon actuation, that allows full closure of the arm upon application of a force, and that utilizes elastic deformation of the arm so that the arm return to an un-deformed geometry when the actuation force is removed.

The apparatus includes a micromanipulation device that grasps and manipulations a micro-sized object and a force generating device that applies the force to the micromanipulation device. Looking first at the micromanipulation device, one embodiment is illustrated in FIG. 2. In particular, the device 10 is a hollow or open frame structure 11 formed by a continuous wall 12. The thickness of the wall 12 is configured so that the wall can flex or bend, as explained below. In addition, the thickness of the wall is preferably of an order that permits production using microfabrication techniques. Thus, in one specific embodiment the thickness t of the wall is at least about 0.1 mm. The width w of the wall is sufficient to provide an adequately dimensioned gripping surface 14 and sufficient to provide adequate strength for the device. In one embodiment, the width w is approximately twice the thickness, such as 0.2 mm in the specific embodiment.

As shown in FIG. 2, the frame 11 defines a base 15, a pair of opposing arms 16 and a saddle 17. The arms 16 terminate in tips 18 facing each other and offset to define a gap g between the gripping surfaces 14. The gap g is sized depending upon the dimensions of the micro-sized object being manipulated. In one specific embodiment, the gap is about 0.2 mm. The saddle 17 is generally parallel to the base 15 and is connected to the tips 18 of the arms 16 by corresponding prongs 19. As reflected in FIG. 2, the hollow frame structure 11 of the device 10 includes an open channel 20 bounded on all sides by the wall 12. The frame also defines an interior opening 21 that communicates with the gap g between the tips of the arms 16. The interior opening 21 permits the application of a force F to the saddle 17.

At least the arms 16, and preferably the entire frame structure 11, is formed of a resiliently flexible material. In one embodiment the device 10 is formed of a single crystal silicon so that the device is not only flexible but also readily fabricated using conventional microfabrication techniques such as photolithography and deep reactive ion etching (as described in more detail herein).

It can be appreciated that the hollow frame structure 11 of the device 10 provides an avenue for flexure of the arms 16 upon the application of the force F. In the embodiment of FIG. 2, the base 15 is fixed and application of the force F to a force transmission surface 22 of the saddle 17 causes the prongs 19 to pull the tips 18 downward in the direction of the applied force. Since the tips are constrained by being integrated into the arms 16, this downward movement causes the arms to bend inward toward each other so that the gap g is reduced. The amount of closure of the gap g is directly related to the force F applied to the saddle. In the specific embodiment described above, a force of 100 mN is sufficient to close the gap.

In order to further facilitate the ease of closing the tips of the fingers, the fingers are rounded, as illustrated in FIGS. 3-6. The device 30 shown in FIG. 3 is a hollow frame structure 31 formed by a continuous wall 32. The thickness and width of the wall 32 can be sized as explained above. The frame includes a base 34, two arms 35 terminating in opposing tips 36 separated by a gap g, and a saddle 37 connected to the tips by corresponding prongs 38. As thus far described, the frame structure 31 is similar to the frame structure 11 of the previous embodiment.

However, unlike the prior frame 11, the arms 35 of the frame 31 are curved from the ends 38 of the base 34 to the tips 36. In one embodiment, the arms 35 are curved at a substantially constant radius R. The radius is determined by the length of the base 34 between the ends 38 and the overall height of the device 30 from the base to the tips 36. In one embodiment, the base length and height are approximately equal and the radius R is approximately twice the base length.

Another difference between the frame 11 and the frame 31 of FIG. 3 is the dimension X corresponding to the distance between the saddle 37 and the base 34. In the embodiment of FIG. 3 the dimension X is approximately greater than the corresponding dimension in the embodiment of FIG. 2. The amount of deflection of the tips 36, or more particularly the amount that the gap g is closed by a particular force is related to the dimension X. In particular, increasing the dimension X results in a decrease in deflection of the tips towards each other.

The device 30 provides several design parameters that can be adjusted to control the amount of closure of the gap g and the amount of force F applied to the saddle 37 to achieve that closure. As explained above, the amount of closure of the gap is a function of the dimension X. In addition, the length of the base between the ends 38 (or more specifically the length between the intersections of the arms 35 with the base 34) affects the gap closure. In particular, increasing the base length increases the displacement of the tips 36. Similarly, increasing the length of the prongs 38 increases the displacement of the tips 36.

One feature of the devices 10 and 30 is that the frame structures are very suitable for microfabrication and the determination of the dimensions of the devices can be made in parallel with determining the fabrication process. In general, consideration of fabrication process flow during the general design of a MEMS structure is a necessity. Among typical micro-fabrication processes the simplest ones are those that require only one photolithography step. Deep reactive ion etching forms high aspect ratio structures by exposing a silicon wafer to a sequence of sulfur hexafluoride ($SF_6$ for etching) and Teflon ($C_4F_8$ for side wall passivation) gases.

Since, the hollow frame structures of the present devices 10, 30 can be obtained by a through-etch of a typical single crystal silicon wafer, a preferred material is single crystal silicon. The mechanical properties of single crystal silicon (SCS) are: density—2330 kg/m$^3$; Poisson's ratio—0.17; Young's modulus—150 GPa; and yield strength—7×10$^6$ kg/mm$^2$. These properties were used to analyze the device 30 in terms of its response to an external force F applied at the saddle. In this analysis, the base 34 was anchored while a force was applied perpendicular to the saddle 37 directed towards the base. Additional constraints in this analysis are that the arms 35 intersect the base perpendicularly and the thickness of the wall 32 was 0.1 mm or 100 μm. The thickness was chosen because it is simple to achieve using photolithography (about 2 orders of magnitude larger than the smallest feature that photolithography can produce).

In this analysis, first the relationship of the force and the horizontal displacement of the tips (gap closure) was verified. Then the effect of the base length was studied on the tip displacement and an acceptable base length for the device was obtained. A basic stress analysis to decide an appropriate device width w was performed, while making sure that this choice and its combination with other geometric parameters result in stresses that do not exceed the yield stress of the SCS material. Finally the effects of the saddle-base spacing X and the prong length on the gap closure was studied. The design parameters were evaluated in three different force magnitudes—100 mN, 100 μN, and 100 nN—to determine the approximate force that is needed to operate the device 30.

Relationship Between Force and Horizontal Displacement of Tips

A micromanipulation device was configured as the device 30 with the dimensions given in Table 1 below was subject to forces of 100 nN, 100 μN and 100 mN applied perpendicular to the saddle. The resulting horizontal displacements of the tips are presented in Table 2. As these results demonstrate, the horizontal displacement of the tips change in direct proportion to the applied force.

TABLE 1

Device dimensions

| Arm Radius | X | Thickness "t" | Width "w" | Base Length | Prong Length | Gap "g" |
|---|---|---|---|---|---|---|
| 9.3 mm (9300 μm) | 2 mm (2000 μm) | 0.1 mm (100 μm) | 0.2 mm (200 μm) | 5 mm (5000 μm) | 2 mm (2000 μm) | 0.20 mm (200 μm) |

TABLE 2

Force vs. horizontal displacement of tips

| Force applied | Horizontal displacement per tip. |
|---|---|
| 100 nN | $8.06 \times 10^{-8}$ mm ($80.6 \times 10^{-6}$ μm) |
| 100 μN | $8.06 \times 10^{-5}$ mm ($80.6 \times 10^{-3}$ μm) |
| 100 mN | $8.06 \times 10^{-2}$ mm (80.6 μm) |

Effects of Variations in the Base Length

The effects of changing the base length on the overall functionality of the device was investigated. The dimensions of the devices used for this analysis are shown in Tables 3 and 4. In particular, the first device had a base length of 5 mm while the second device had a smaller base length of 1 mm. As the results of the analysis of both devices summarized in Table 5 shows, increasing the base length increases the displacement of the tips 36 of the device arms 35.

TABLE 3

Dimensions for device with base length = 5 mm.

| Arm Radius | X | Thickness "t" | Width "w" | Base Length | Prong Length | Gap "g" |
|---|---|---|---|---|---|---|
| 11.6 mm (11600 μm) | 5 mm (5000 μm) | 0.1 mm (100 μm) | 0.2 mm (200 μm) | 5 mm (5000 μm) | 2 mm (2000 μm) | 0.20 mm (200 μm) |

TABLE 4

Dimensions for device with base length = 1 mm.

| Arm Radius | X | Thickness "t" | Width "w" | Base Length | Prong Length | Gap "g" |
|---|---|---|---|---|---|---|
| 11.6 mm (11600 μm) | 5 mm (5000 μm) | 0.1 mm (100 μm) | 0.2 mm (200 μm) | 1 mm (1000 μm) | 2 mm (2000 μm) | 0.20 mm (200 μm) |

TABLE 5

Effect of base length on prong displacement.

| Force applied | Horizontal displacement per tip for base length = 5 mm | Horizontal displacement per tip for base length = 1 mm |
|---|---|---|
| 100 nN | $6.28 \times 10^{-8}$ mm ($62.8 \times 10^{-9}$ μm) | $7 \times 10^{-9}$ mm ($7 \times 10^{-6}$ μm) |
| 100 μN | $6.28 \times 10^{-5}$ mm ($62.8 \times 10^{-3}$ μm) | $7 \times 10^{-6}$ mm ($7 \times 10^{-3}$ μm) |
| 100 mN | $6.28 \times 10^{-2}$ mm (62.8 μm) | $7 \times 10^{-3}$ mm (7 μm) |

In this analysis, the reduction in base length from 5 mm to 1 mm led to a reduction in gap closure of about 90%. For a 2 mm initial undeformed gap g of 0.2 mm this 90% reduction can be problematic. Consequently, for one specific embodiment a base length of 5 mm was selected.

Relationship Between Stress and Width of the Device ("w")

Pro-Mechanica software was used to observe points of maximum stress in the device. Increase in the width of the device provides increased surface and cross sectional areas and is thus expected to lead to reduced stresses. While variations in other dimensions can also affect the stresses it is believed that detrimental effects due to the other dimensions can be compensated by changing the wall width w. Two devices were considered: one with a width of 0.2 mm and another with a width of 0.1 mm. The common dimensions of the two devices are summarized in Table 6. Stresses produced in both the devices are presented in Table 7.

TABLE 6

Common dimensions of the two devices used to study the relationship between stress and device width (w).

| Arm Radius | X | Thickness "t" | Base Length | Prong Length | Gap "g" |
|---|---|---|---|---|---|
| 3 mm (3000 μm) | 3 mm (3000 μm) | 0.1 mm (100 μm) | 5 mm (5000 μm) | 3 mm (3000 μm) | 0.20 mm (200 μm) |

TABLE 7

Results of the stress analysis with different device widths 0.2 mm and 0.1 mm.

| | Width = 0.2 mm | Width = 0.1 mm |
|---|---|---|
| Force applied | Stress (kg/mms²) produced | Stress (kg/mms²) produced |
| 100 nN | $7.6 \times 10^{-1}$ | 1.39 |
| 100 μN | $7.6 \times 10^{2}$ | $1.39 \times 10^{3}$ |
| 100 mN | $7.6 \times 10^{5}$ | $1.39 \times 10^{6}$ |

The stress value at 100 mN force for a device width of 0.1 mm is $1.36 \times 10^{6}$ kg/mms² which is very close to the maximum yield stress of single crystal silicon ($7 \times 10^{6}$ kg/mms²). On the other hand, the stress value for the device width of 0.2 mm at 100 mN force is $7.6 \times 10^{5}$ kg/mms², which is about 10 times less than the maximum yield stress of silicon. As expected, stress magnitudes decrease as the width of the device (w) increases. Stress can be decreased even further by increasing the thickness t of the device from 0.1 mm in the analysis to 0.5 mm. However, increasing the wall thickness of the frame structure reduces the displacement of the arms 35 for a given applied. In order to achieve equivalent horizontal displacement of the tips, or closure of the gap g, more force is needed if the wall thickness is increased. For the device 30, a 100 mN force provides good arm displacements for the device. While it seemed counter-intuitive to use such a large force on a device with dimensions of a few millimeters, the stress analysis demonstrates that application of such a force for the actuation of the device will not exceed the strength capabilities of the device material due to the specific geometry of the device.

Selection of Prong Length and X

With the base length at 5 mm and the width w of the device set to 0.5 mm optimization of the prong length (PL) and dimension X followed. In this analysis, the dimension X was varied from 1 to 5 mm, and at each value for X the prong length was varied from 1 to 5 mm. The analysis was performed at the same three force magnitudes applied in the prior analyses —100 nN, 100 μN, and 100 mN. For simplicity, only the results that correspond to 100 mN force is provided since this force provides maximum displacements at the tips. The results of the analysis are shown in the chart of maximum horizontal displacement in FIG. 4a and maximum stress in FIG. 4b.

Figure 4B:
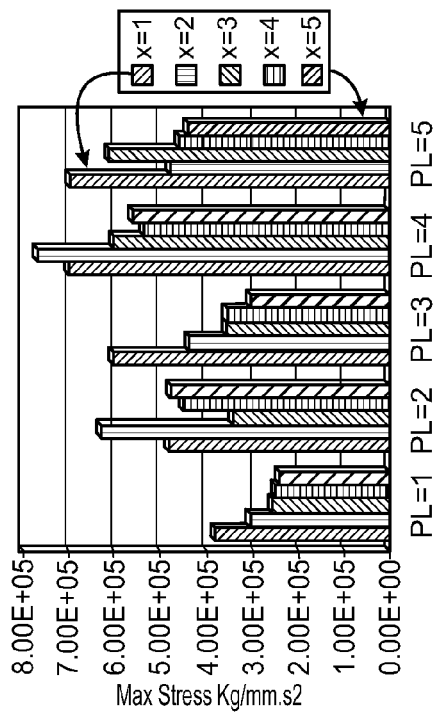
FIGS. 4a, 4b are graphs of displacement and stress in the arms of the device shown in FIG. 3 during operation of the device.
Figure 4A:
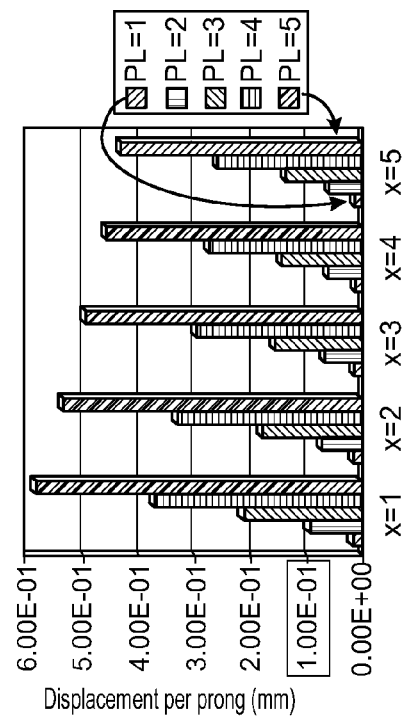

For one device 30, the rest or undeformed gap g is 0.2 mm. Hence, each arm 35 is required to move a horizontal distance of 0.1 mm to achieve full closure of the tips. This deflection value is encircled in FIG. 4a and the horizontal line corresponding to this deflection intersects the vertical bars with a combination of dimensions X and prong length PL that produces that necessary displacement when a force of 100 mN is applied to the saddle. Hence a device designed with these dimensions is likely to produce full-closure of the tips. As shown in FIG. 4a, a prong length of 3 mm is appropriate because it produces nearly full closure at all values of the dimension X. For certain designs, a prong length of 2 mm is appropriate even though the 0.1 mm displacement line does not intersect the 2 mm PL bar for any dimension X. However, the arm displacement values are sufficiently close to the desired 0.1 mm deflection that full closure can be achieved by a slight increase in the applied force.

As reflected in FIG. 4a, increasing prong length increases tip displacement, which is expected since a zero prong length would rigidly connect the tips allowing no closure. In addition, increasing dimension X seems to reduce the horizontal tip displacement. Although this appears counter-intuitive it may be explained because increasing X results in longer and hence more slender arm which in turn bulge outward so that the deformation of the arms is absorbed in this bulging motion rather than in closure of the tips.

In order to choose a value for dimension X a stress analysis was performed. The results are summarized in chart of FIG. 4b in which the y-axis represents the maximum stress produced in the device and the x-axis represents the prong lengths PL. The vertical bars at each prong length represents the different dimensions X. As FIG. 4b shows, increasing prong length increases the resulting stress, which is expected since increasing PL increases deformation and hence results in larger strains. Also, there is a general trend of reduction in stress with increased dimension X which is expected since increasing X results in smaller deflections in the device (as discussed before). For a prong length PL of 2 mm a dimension X of 3 mm produces stresses that are about 20 times less than the yield stress of single crystal silicon ($7 \times 10^6$ kg/mm·$s^2$ or 7 GPa), In view of the analyses described above, it was determined that one optimum design for a micromanipulation device for micro-sized objects has a base length of 5 mm long, a width w of 0.5 mm, and the wall thickness t of 0.1 mm, prong lengths of 2 mm and a dimension X of 3 mm. This structure is capable of being actuated comfortably by a 100 mN force.

It is noted that the size of the gap g in the device 30 can be sized to accommodate the particular micro-sized object being manipulated. In addition, the tips and prongs can be functionalized—i.e., treated with a biological entity, such as a virus, protein or DNA strain, or treated with a chemical suitable for cellular treatment in pharmacological studies. The functionalized tips and prongs can be brought in contact with cells under study to make surface contact with the cell membrane or to pierce the cell membrane to implant the biological entity within the cells (as described in more detail herein). For such applications the tips and prongs will require a rest-opening dimension or gap g appropriate for cellular manipulations.

The device 30 can be modified to permit piercing of a captured micro-sized object, such as a cell. In one embodiment, a device 50 includes the continuous wall 51 defining the opposing arms 52 and prongs 54A. In order to capture an object, such as a cell, one of the prongs is modified to define a retention notch 55A adjacent the tips 53. The notch has a depth sufficient to at least temporarily retain the object. In order to help restrain or hold the object within the notch 55A the notch may be provided with a suction opening 56A associated with a suction tube 57A extending through one arm 52. The suction tube 57A is connected to a vacuum generator (such as a manual syringe) or to an external vacuum source. When the micromanipulation device 50 is used to grasp an object such as a cell, vacuum may be applied at the opening 56A to help draw the cell into the notch 55A and hold the cell in that position.

Figure 5:
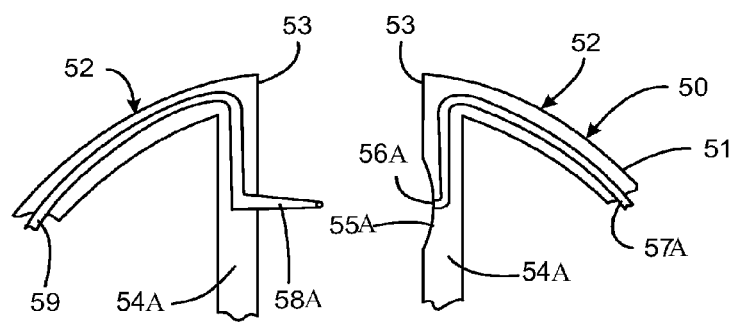
FIG. 5 is an enlarged view of the tips of a micromanipulation device according to another disclosed embodiment.

In a further feature of the device 50, the opposite arm may include a piercing element 58A aligned with the notch 55A. The piercing element is configured to pierce the object, such as to pierce a cell membrane or wall. The piercing element 58A may be hollow and connected to a tube 59 extending through the opposite arm 52, as shown in FIG. 5. The tube 59 may be connected to a vacuum generator if the object of the piercing element is to remove the contents of the object. Alternatively, the tube 59 may be connected to a source of a biological entity or chemical that can be used to functionalize the object or deliver material into the object. Thus, as described above, the retention notch 55A and piercing element 58A can be used to introduce a chemical or biological entity, including but not limited to a particular virus, protein, DNA or RNA into a cell for modifying the object chemically or biologically. The tube may also be used to direct a fluid (liquid or gas) outward if necessary to dislodge the cell from the piercing element 58A. Likewise, the suction tube 57A may be used to direct a fluid outward through the opening 56A to dislodge the cell from the retention notch 55A.

As shown in FIG. 5, the retention notch 55A is offset from the tips 53. The region between the notch (and piercing element) and the tips 53 provide a gripping surface for manipulation of the micro-sized object when no functionalization or material delivery using piercing is desired. The element 58A can also be used in conjunction with a vacuum source to extract or suck out the contents of the pierced object, for example to extract the contents of a cell.

Modifications to the Base and Saddle

As explained above, the micromanipulation assembly includes the device 30 and a force generating device that applies a force to the saddle 37 of the device. In one aspect of the present invention, the force generating device can be a manual actuator. In one specific embodiment, the manual actuator is a micrometer. In order to easily interface the micromanipulation device 30 with the force generating device, certain modifications to the device design may be desirable. In certain embodiments these modifications include increasing the length of the saddle for easier alignment and connection to an actuator mechanism, opening the base to simplify access for the actuator mechanism, rounding sharp corners to reduce stress riser, and increasing the gap g between the tips to accommodate larger objects. With respect to the latter modification, it can be appreciated that the gap dimension can be adjusted depending upon the micro-sized objects being manipulated. In certain embodiments, the gap g can be 0.2 mm (200 μm) or 0.3 mm (300 μm).

With respect to the saddle and base modification, a modified micromanipulation device 50 is shown in FIG. 6. Like the prior devices, the device 50 is in the form of a hollow frame structure 51 formed by a continuous wall 52. The frame structure includes a base 54, opposing arms 55 that form a gap g between the tips 56, and a saddle 57 that is connected to the tips by corresponding prongs 58. (It is noted that the gap g is exaggerated in the figure for clarity). As reflected in FIG. 6, the base 54 is not continuous across the bottom of the device, as with the devices 10, 30, but instead defines a base opening 60. The base opening 60 is sized to permit access to the saddle 57 by an actuator mechanism, as described herein. The prongs 58 are not linear, as in the prior embodiments, but are instead curved so that they are wider at the interface with the saddle 57 than at the interface with the tips 56. Accordingly, the saddle 57 is longer than the gap g. In one specific embodiment, the saddle has a length of 2.5 mm. The saddle and prongs thus define an interior opening 61 that is larger than the interior opening in the devices 10, 30. This larger interior opening may accommodate an actuator mechanism; however, the primary goal is to increase the length of the saddle 57 to facilitate connection to the actuator mechanism.

In a further modification from the device 30, the device 50 incorporates a feature to facilitate handling of micromanipulation devices. Thus in one embodiment, a tab 63 is attached to each portion of the base 54, as shown in FIG. 6. The tabs are sized to be manually grasped to remove and replace the micromanipulation device or remove the device from engagement with an actuator mechanism. In one specific embodiment, these tabs 63 are in the form of flat rectangles with dimensions 5 mm×3 mm. As described below, the tabs 63 can also provide a surface for supporting the micromanipulation device 50 on a fixture used to integrate the micromanipulation device with a force generating device (or actuator mechanism).

Actuator

Figure 7:
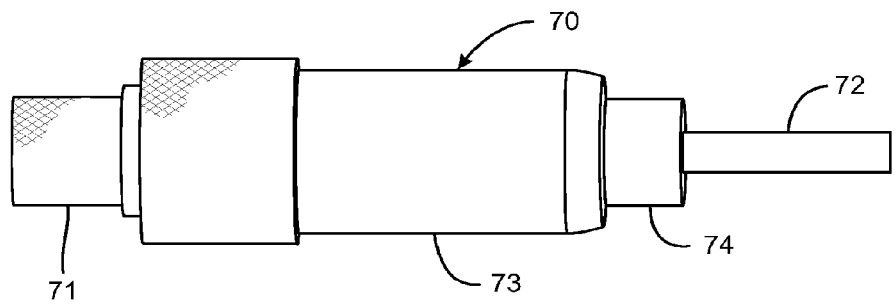
FIG. 7 is a side view of a force generating device for applying a force to the micromanipulation device in FIGS. 2-6, embodied as a micrometer.

The micromanipulation assembly disclosed herein further includes a force generating device that is operable to apply a force to the saddle 17, 37, 57 of the devices 10, 30, 50 described above. In one embodiment the force generating device is manually operated, which greatly simplifies the use and usability of the micromanipulation assemblies disclosed herein. A suitable device 70 constitutes a standard depth micrometer, as illustrated in FIG. 7. The micrometer 70 includes a thimble 71 that is manually rotated while holding the micrometer body 73 to translate the spindle 72 that projects from hub 74. One selected micrometer 70 has a spindle resolution of 0.001 mm (1 µm) with a dynamic range of 25 mm. For the micromanipulation devices 10, 30, 50, a movement of saddle of 0.067 mm (67 µm) under a 100 mN force is sufficient to close the tips 18, 38, 56 or gap g completely. The selected micrometer can easily produce the necessary 67 µm displacement and can easily sustain forces much larger than 100 mN. The micrometer 70 preferably includes a non-rotating spindle 72 which facilitates connection to the micromanipulation device directly or by way of an interface structure.

Design of the Interface

As thus far described, a micromanipulation assembly includes a micromanipulation device, such as the devices 10, 30 and 50 described above, and a force generating device, such as the micrometer 70. In certain embodiments, the micromanipulation devices 10 or 30 can be directly mounted on the micrometer 70, if appropriately dimensioned. In these embodiments, the base 15 or 34 can be supported on the hub 74 of micrometer, while the spindle 72 passes through an opening in the base. The spindle 72 can be attached to the saddle 22, 37 in a suitable manner to allow the spindle to apply a downward force F (FIG. 3) to the saddle to close the tips of the device. While the micromanipulation devices 10, 30 may be modified for direct mounting on the micrometer 70, the modifications may limit the functionality and usability of the devices, and may particularly limit the size of objects that can be manipulated (due to size increases of the devices).

Consequently, in a further aspect of the disclosure, an interface or fixture is provided that easily connects the micromanipulation devices 10, 30, 50 to the force generating device 70. The interface is preferably compact so as not to interfere with the operation of the devices. Moreover, the interface preferably facilitates placement and alignment of the micromanipulation device to the interface without the need for a microscope.

Figure 8:
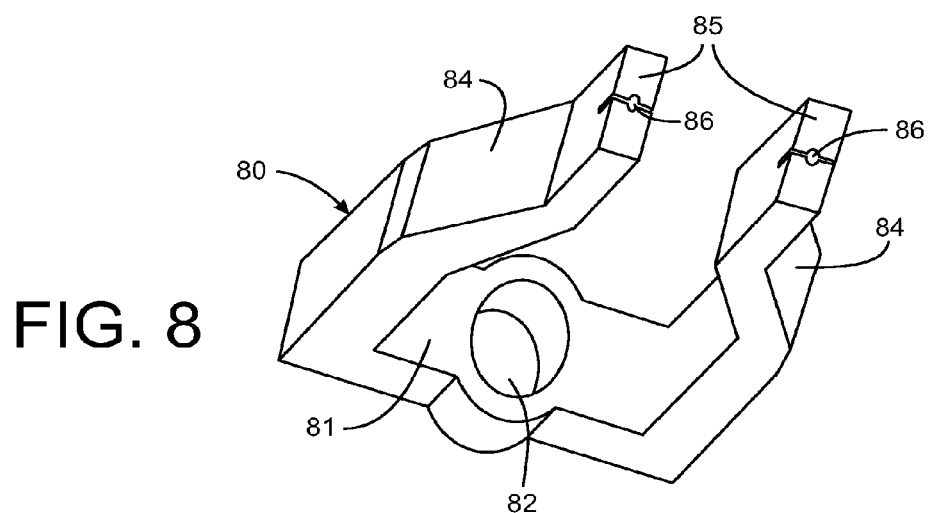
FIG. 8 is a top perspective view of a fixture for use with the micromanipulation devices and force generating device shown in the prior figures according to one disclosed embodiment.

A first concept for the interface is shown in FIG. 8). The interface is a fixture 80 that includes a base 81 defining a bore 82 for engagement with the hub 74 of the force generating device or micrometer 70 (FIG. 7). The bore 82 may be configured for press-fit engagement with the micrometer hub or for another suitable removable engagement. Alternatively, a locking element 76 (FIG. 9) may be provided that engages a portion of the hub 74 projecting through the bore 82. The fixture 80 includes arms 84 projecting from the base and converging at their free ends 85.

The ends 85 of the arms 84 define a mounting surface on which the micromanipulation device 50 is removably mounted. The ends may incorporate a mounting feature 86 configured to engage the tabs 63 of the device 50 (FIG. 6). In one embodiment the mounting feature 86 may be in the form of slots defined across the width of the arms 84 into which the tabs are placed to support the device 50. The slots preferably have a depth sufficient to fully receive the tabs. The slots may also be configured to receive a locking element to lock the tabs within the slot. It is understood that other mounting features may be contemplated, along with corresponding modifications to the tabs of the micromanipulation device. For instance, the tabs may be oriented to lay flush against the mounting surfaces 85 in which case an adhesive interface may be utilized, or the tabs may be fastened to the mounting surfaces by set screws.

As shown in FIG. 9, the arms 84 have a length that is greater than the extension of the micrometer spindle 72. Since the end of the spindle is nominally larger than the length of the saddle 57 of the device 50, an adapter 87 is provided. The adapter is configured to engage or be mounted on the spindle 72, such as by a press-fit bore 88. The adapter tapers to an end face 89 that is sized to correspond to the dimensions of the saddle 57 if the micromanipulation device 50. Thus, in the illustrated embodiments the end face has a width of about 0.1-0.2 mm and a length of 2.5 mm. The adapter 87 may be generally pyramidal in configuration since the base of the adapter must be large enough to accommodate mounting to the spindle 72.

A detail view of the interface between the adapter 87 and the saddle 57 of the device 50 is shown in FIG. 10. As seen in this figure, the actuation force F applied to the saddle is directed away from the tips 56 of the device. The end face 89 of the adapter 87 abuts the underside of the saddle 57—i.e., the surface of the saddle facing away from the tips and towards the base 81 of the fixture 80 on which the device 50 is mounted. In one embodiment, the underside surface of the saddle 57 is adhered to the end face 89 of the adapter 87. This has certain disadvantages since the device 50 cannot be easily connected and disconnected from the adapter 87. Moreover, the gluing the two components together complicates the alignment of the saddle relative to the spindle that is necessary to ensure that movement of the spindle produces only a linear force F.

Figure 12:
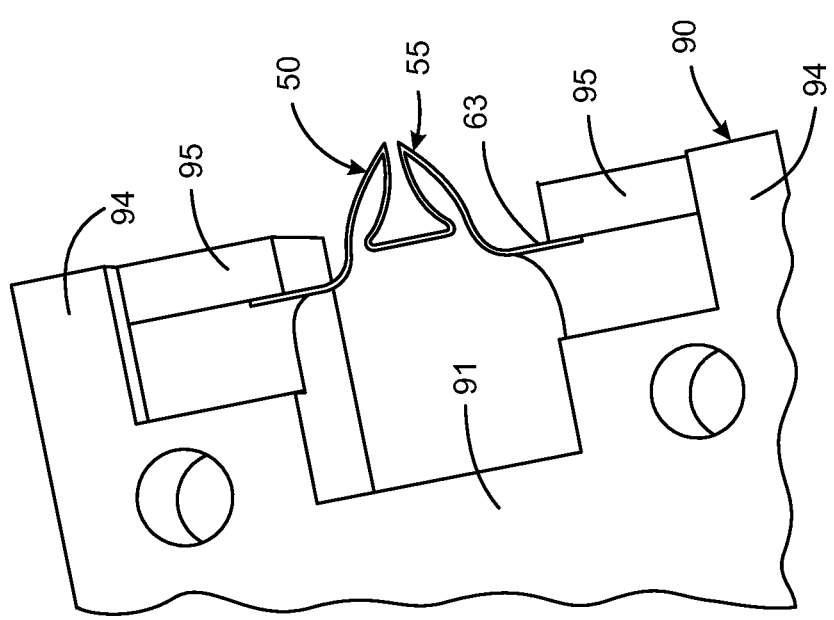
FIG. 12 is an enlarged view of a portion of the fixture shown in FIG. 11 with a micromanipulation device according to FIG. 6 mounted thereon.

In order to address these potential shortcomings another fixture 90 is provided, as illustrated in FIG. 11. The fixture includes an annular base or collar 91 configured to receive the hub 74 of the force generating device 70. The hub includes a bore 92 through which the spindle 73 projects when the micrometer is mounted to the fixture. The fixture 90 includes arms 94 projecting from the base 91, each arm including a mounting recess 95 sized to accept the tabs 63 of the device 50. As shown in the enlarged view of FIG. 12, the tabs 63 rest flush against the surface of the recesses with the arms 55 of the device 50 projecting away from the annular base 91 of the fixture. The fixture includes a pair of clamps 97 (only one is shown in FIG. 11 for clarity) that interlock with the arms 94. The clamps 97 include a clamping block 98 that is sized to fit snugly within the recess 95 so that the surface of the clamping block bears against the tab 63 of the device 50. Clamping bores 96, 99 may be provided in the arms 94 and clamps 97 to lock the clamps to the arms, for instance by mounting screws.

In the illustrated embodiment, the fixture 90 is compact measuring only 20 mm in length (from the base to the end of the arms) and only 15 mm in width. The fixture can thus be easily manipulated by hand to mount the micromanipulation device 50 and micrometer 70. In addition, the block construction of the fixture allows the fixture to be clamped to a working surface.

Modifications to the Interface

Figure 13:
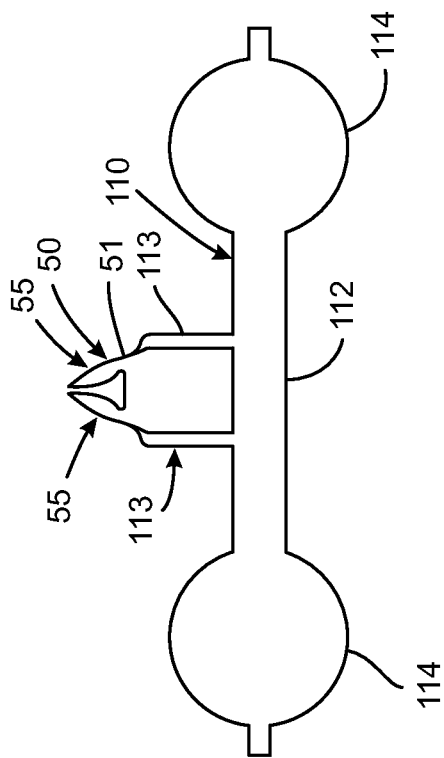
FIG. 13 is a top view of a micromanipulation device according to still another disclosed embodiment.

One limitation of the fixture 90 and micromanipulation device 50 is that it can be difficult to hold the device and place it within the fixture. Another limitation of the device 50 is that the end face 89 of the adaptor 87 must be affixed to the underside of the saddle. In order to address these limitations a modified mounting structure is provided for the device 50 in lieu of the tabs 63. Thus, a mounting structure 110 is affixed to the hollow frame structure 51 of the device 50 shown in FIG. 6, as illustrated in FIG. 13. The mounting structure 110 includes a bridge member 112 with extension beams 113 projecting perpendicularly from the bridge member. The extension beams 113 are engaged to the micromanipulation device 50 to support the device farther away from the fixture without shifting the center of mass of the device (in order to prevent the device from falling out of the fixture). In one embodiment the beams have a length of 6 mm. The extension beams may be engaged to the device 50 at the legs 55, thereby eliminating the base 54, or the beams may be engaged to the base 54 in a manner similar to the tabs 63.

In a further feature, the mounting structure 110 includes enlarged tabs 114 at the lateral ends of the bridge element 112. In order to facilitate manually grasping, the tabs are generally circular with a diameter large enough to be grasped. In one specific embodiment the tabs 114 have a 10 mm diameter.

Figure 14:
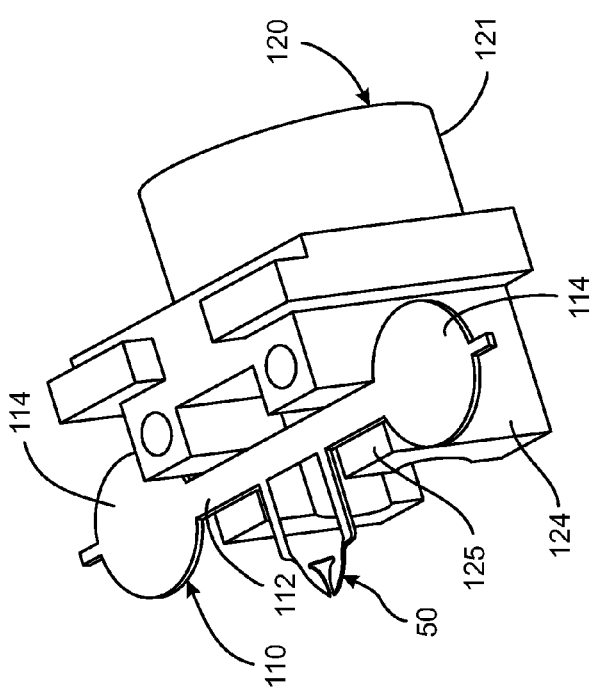
FIG. 14 is a perspective view of the fixture of FIG. 11 with the device of FIG. 13 mounted thereon.

In another aspect, the fixture 90 is modified to accommodate the bridge element 112 and circular tabs 114 of the mounting structure 110. In particular, a fixture 120 shown in FIG. 14 is constructed similar to the fixture 90, with a similar annular base 121 and arms 124. However, unlike the other fixture, the arms 124 of the fixture 120 include a notch 125 (rather than a recess 95) that spans the width of each arm. The bridge element 112 and tabs 114 of the mounting structure 110 can thus project beyond the sides of the arms 124 of the fixture, as illustrated in FIG. 14. It can be appreciated that the tabs 114 can be easily accessed to remove a micromanipulation device 50 from the fixture. The fixture 120 includes clamps 127 (FIG. 16) that are configured similar to the clamps 97, but modified to conform to the notch 125 in the arms 124 of the fixture.

Figure 16:
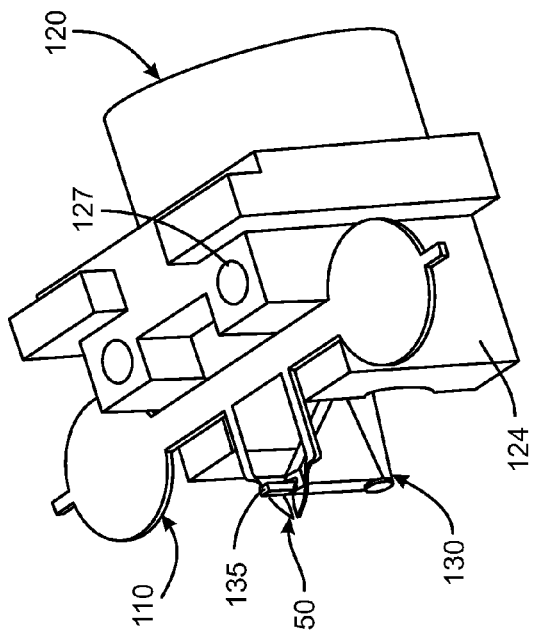
FIG. 16 is a further perspective view of the arrangement shown in FIG. 14.
Figure 15:
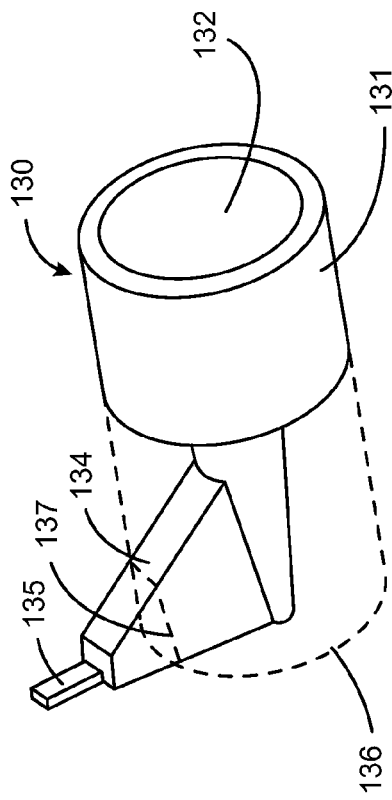
FIG. 15 is an enlarged view of an adaptor for use with the fixture and device arrangement shown in FIG. 14.
Figure 17:
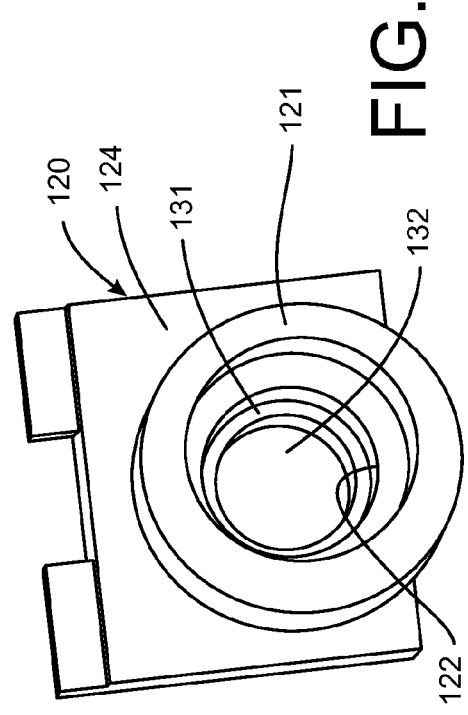
FIG. 17 is an enlarged end view of the fixture of FIG. 11 and the adaptor of FIG. 15.

It can be appreciated that the bridge element 112 of the mounting structure 110 prevents access to the saddle 57 of the device 50 directly in the plane of the device 50 or directly along the axis of the micrometer spindle 73 when the micrometer. Consequently, in a further modification from the fixture 90, the fixture 120 offsets the annular base 121 from the plane of the device 50, as seen in FIGS. 14 and 16. This arrangement of the annular base 121 relative to the saddle 57 of the device 50 allows the force to be applied to a force transmission surface of the saddle that faces the tips 56 of the device, rather than at the underside of the saddle as in with the fixture 90. Since the line of action of the micrometer spindle is offset from the force transmission surface of the saddle 57, an adaptor 130 is provided that bridges this offset. In particular, as shown in FIGS. 15 and 17, the adaptor 130 includes a hub 131 that defines a bore 132 to slidably receive the hub 74 of the micrometer. (It is understood that the hub 131 may be modified for engagement to another suitable force generating device). The adaptor further includes a beam 134 projecting from the hub 131 and terminating in a post 135 that is sized for flush contact with the saddle 57 of the device 50, as depicted in FIG. 16.

In the illustrated embodiment, the hub 131 is shown as incorporating a conical portion from which the beam 134 projects. In an alternative embodiment, the hub 131 may be extended to the location of the post 135, as depicted in the phantom lines 136. With this modification, the beam is reduced to the beam 137 depicted by the phantom lines 137. In either embodiment, the extension from the hub 131 includes a bore (not shown) for receiving the spindle 173 of the micrometer. The bore may be sized for press-fit engagement with the spindle or may be glued to the spindle. Alternatively, the bore 132 of the hub 131 may be press-fit or glued onto the spindle. The engagement between the adaptor 130 and spindle 73 must be sufficient to transmit force to the saddle of the micromanipulation device without becoming dislodged. In particular, as the micrometer spindle is retracted the post 135 contacts and exerts a force F against the saddle to thereby close the arms 55 of the device 50. Conversely, as the spindle is advanced (i.e., extended toward the device 50), the force on the saddle is relieved, and the natural elastic resilience of the device 50 causes the arms to move outward, thereby opening the tips 56 to the neutral gap g. This also demonstrates that the choice of a non-rotating spindle micrometer for the application was necessary.

Figure 18:
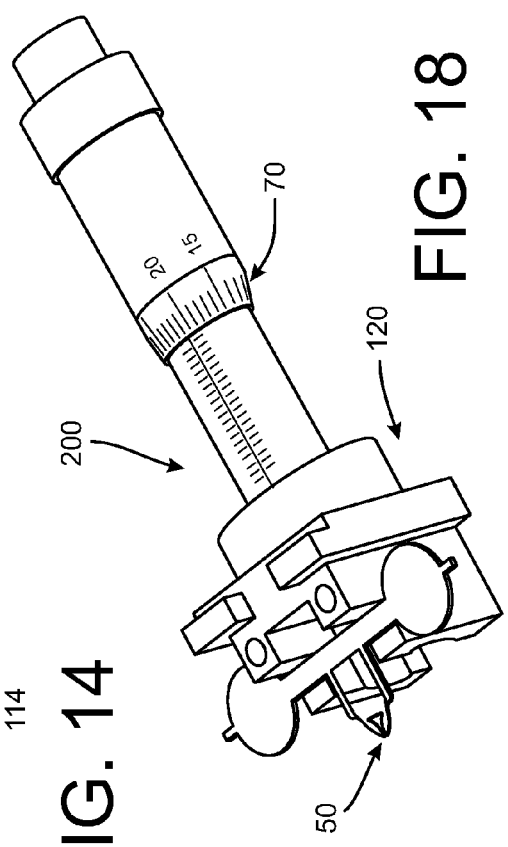
FIG. 18 is a perspective view of a micromanipulation assembly according to one disclosed embodiment.

The assembly of the complete micromanipulation assembly can be easily achieved by first mounting the fixture 120 on the working end of the force generating device or micrometer 70. The hub 74 of the micrometer is engaged within the annular base 121 with the spindle projecting through the bore 122 (FIG. 17) into the space between the arms 124 of the fixture. The adaptor 130 can be mounted on the spindle 73 of the micrometer with the post 135 facing upward toward the mounting recesses 125 of the fixture arms. The micromanipulation device 50 can then be mounted on the fixture, with the mounting structure 110 positioned within the notches 125 of the fixture, as depicted in FIG. 14. Care is taken to ensure that the post 135 projects through the interior space 61 (FIG. 6) of the device 50 with the post immediately adjacent the saddle 57. With the device 50 properly positioned and aligned within the notches 125, the clamps 127 may be added to complete the assembly 200 as shown in FIG. 18.

Fabrication

The micromanipulation devices 10, 30, 50 described herein are readily suited to fabrication using standard cleanroom microfabrication processes. The fixtures 80, 90, 120 can be machined from sterilizable or autoclavable materials using standard machine shop techniques.

Micromanipulation Device Micro-Fabrication

Figure 19:
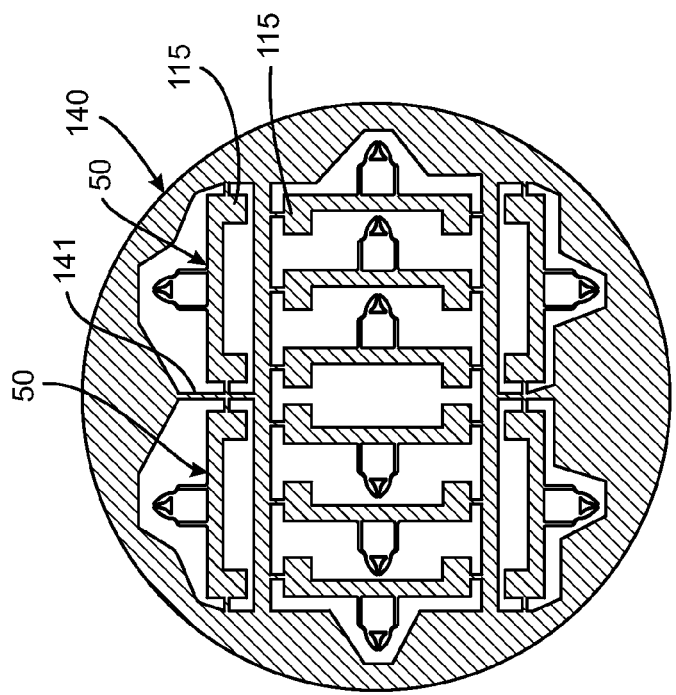
FIG. 19 plan view of a wafer with an etched pattern for fabrication of the micromanipulation device of FIG. 6.

A first step in the microfabrication of the devices 10, 30, 50 can be standard photolithography to prepare a single crystal silicon wafers for a deep reactive ion etching process. In an illustrated embodiment, the silicon wafer 140 has a thickness of 0.5 mm (500 μm)-thick, and a diameter of 100 mm (4 in.), as shown in FIG. 19. The wafer may be provided with a 1 μm thick thermally grown oxide that can serve as a suitable mask (in addition to the photoresist that is used during photolithography) for deep reactive ion etching.

Once the devices 50 are patterned using lithography, as shown in FIG. 19, the wafer is etched throughout its entire 500 µm thickness to obtain the individual devices. In one specific embodiment, a Bosch type DRIE (a form of dry etching) can be employed to perform the etching. This type of DRIE uses plasma containing sulfur hexafluoride [$SF_6$] ions to attack the bare silicon in each etching cycle. A passivation cycle deposits a layer of inert Teflon [$C_4F_8$] to prevent the etching gas from attacking the sidewalls, allowing high aspect ratio etches. Each cycle lasts a few seconds and is repeated many times. This process produces high aspect ratio walls and progresses faster and with more precision than wet etching.

The mask shown in FIG. 19 can be developed using AutoCad software. The large size of the handling tabs 114 shown in FIG. 13 can limit the mask to only six devices on a 100 mm diameter wafer. In an attempt to fit more devices into a single wafer, the circular tabs can be replaced with 7×5 mm rectangular tabs 115. The rectangular tabs increase the total number of devices on the mask to 10 while still providing sufficiently sized handling tabs.

The following steps were followed in one specific microfabrication process to produce the wafers 50. It is of course understood that other microfabrication processes may be implemented to produce the wafers and devices disclosed herein. For the photolithography, the following steps were implemented:
a) Wafer cleaning using acetone and methanol.
b) Dehydration of wafer at 200° C. for 10 minutes on hotplate.
c) Application of HMDS (hexa methyl di-silazane to improve photoresist adhesion), at 4000 rpm for 30 seconds.
d) Application of AZ 9260 photoresist, at 4000 rpm for 30 seconds.
e) Soft-bake at 110° C. for 2 minutes on hotplate.
f) Second application of AZ 9260 photoresist (to increase thickness of photoresist), at 4000 rpm for 30 seconds
g) Soft-bake at 110 DC for 2 minutes on hotplate.
h) Expose wafer for 58 seconds on 4 inch mask aligner (21 mW bulb intensity).
i) Develop in 1:4 AZ 400K to DI Water solution respectively, for 3 to 5 minutes.
j) Hard-bake at 120° C. on hot plate for 5 minutes.
k) Oxide Etch (pattern definition)
i) Immerse wafer in buffered hydrofluoric acid for 10 minutes.
ii) Wash wafer thoroughly in DI water for 6 minutes—3 minutes in still DI water bath and 3 minutes under running DI water.
iii) Hard-bake at 120° C. on hot plate for 30 minutes.

The deep reactive ion etching (device formation and release) occurs using the following steps in the specific example:
a) Pre-processing (to bond the 4 inch wafer onto the 6 inch wafer required by DRIE)
i) Heat 6 inch carrier wafer at 90° C. on hot plate for 10 seconds.
ii) Apply 555-crystal bond glue onto the center of the wafer.
iii) Press 4 inch wafer onto the carrier wafer.
iv) Apply HMDS around the 4 inch wafer.
v) Apply photoresist AZ 9260 at 2000 rpm for 30 seconds.
vi) Bake in oven for 10 minutes at 120° C.
b) DRIE (etching of the silicon)
i) Oxygen clean for 10 minutes.
ii) Etch cycle at 8.5 seconds
iii) Passivation cycle at 3 seconds.
iv) Total cycles for etching 500 microns=493 cycles.
v) Total time for etch=95 minutes.
vi) Etch rate=5.3 microns/minute.
c) Post processing (to detach the 4 inch wafer from the 6 inch carrier wafer)
i) Immerse 6 inch carrier wafer into water bath at 70° C. to dissolve the glue and detach the 4 inch wafer.
ii) Immerse 4 inch wafer in PRS 2000 solution at 90° C. for 60 minutes to dissolve passivation layer (deposited during DRIE) from wafer surface.
iii) Immerse wafer in acetone bath to remove any remaining glues from the structures.

Fabrication of the Fixture

The fixture 80, 90, 120 can be fabricated in a machine shop. The selected material is preferably light weight for handling and balancing during use, susceptible to micro-machining, and sufficiently strong for fabrication and utilization. Thus, in one embodiment, the fixture, including the clamps 97, 127, is formed of puca-graphite. It can be appreciated that other materials and manufacturing techniques may be utilized to produce the fixtures 80, 90, 120. For instance, the fixtures may be cast or molded from a high-density plastic.

Implementation of the Micromanipulation Device

The micromanipulator assembly 200 disclosed herein (FIG. 18) provides a robust and versatile device. No external electrical or pneumatic power is required to operate the apparatus. The micromanipulation devices 10, 30, 50 disclosed herein, once assembled with a fixture 80, 90, 120 and the micrometer, can be easily attached or mounted onto any additional mechanical or electromechanical platform depending on the user's need.

In one embodiment, the assembly 200 was created by first removing a micromanipulator device 50 from the wafer 140 (FIG. 19) by means of scribing the breakout tabs 141 that connect each device to the rest of the wafer. Then, the device was picked up via a handling tab 115 using ordinary metallic tweezers. The metallic tweezers are used to mount the device 50 onto the notch 125 of a fixture 120, as shown in FIG. 14, while simultaneously aligning the saddle 57 with the force transmission post 135. This step can be performed without the need for a microscope since there is sufficient space at the interior opening 61 within the saddle area. Once the alignment is accomplished, the clamps 127 can placed manually using the ordinary tweezers and secured with screws.

Figure 20:
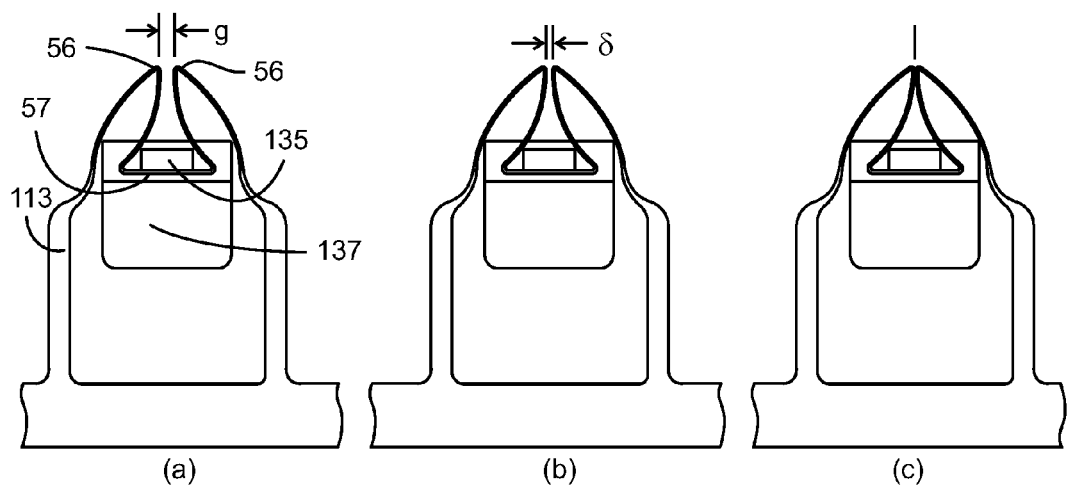
FIGS. 20a-c are enlarged views showing deflection of the micromanipulation device.
Figure 21:
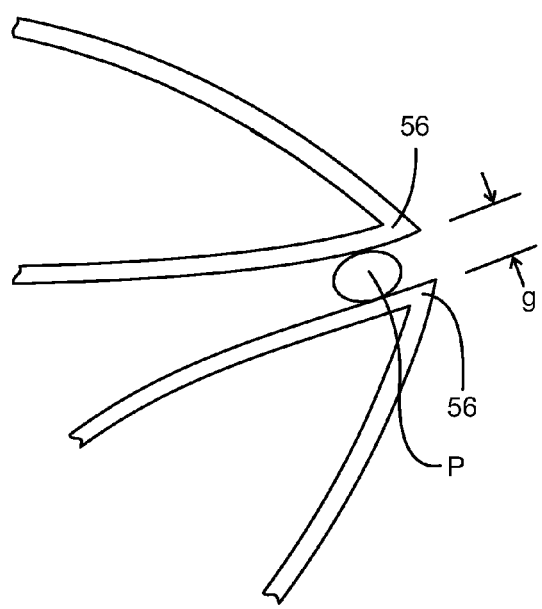
FIG. 21 is an enlarged view of the tips of the device shown in FIGS. 20a-c grasping a particle.

Manually turning the thimble 71 of the micrometer 70 in the clockwise direction results in backward motion of the micrometer spindle (i.e., away from the tips 56 of the device arms) which thereby moves the post 135 backward. Continued clockwise rotation of the thimble moves the post back until it is in contact with the saddle of the device, as shown in FIG. 20*a*. At this point, the tips 56 of the device are at their neutral state, spaced apart by the gap g. Further incremental backward motion of the post 135 is immediately accompanied by elastic deformation of the arms 55 of the micromanipulation device 50, leading to closure of its arms to an intermediate deflection δ shown in FIG. 20*b*. Further movement can close the gap entirely, as shown in FIG. 20*c*. Conversely, turning the micrometer thimble counter-clockwise moves the post 135 forward so that the resilience of the device 50 returns the device to its neutral or un-deformed position. Although basic opening-closing of the device can be achieved to some extent with naked eye, observing the operation with a microscope is preferable in order to see the tips 56 clearly and hence to accurately position the tips to grab a particle P, as shown in FIG. 21. Using a microscope is also advantageous in order not to over-close the device which will exert excessive forces on the device or on the particle P, which can result in rupture. In the embodiment depicted in FIGS. 20*a-c,* a saddle movement of 75 μm resulted in the full closure of the tips.

The micro-sized objects being retrieved or manipulated by the device 50 may be located on various surfaces. In the embodiment shown in FIG. 21 the particle P was placed on a glass slide. The manipulator assembly 200 can be positioned in a commercial translation or motion stage operable to move the assembly down, backward and forward with micrometer resolution. Rotational motion can also be achieved using appropriate rotational-translational stages. The fixtures 90, 120 can be configured to be readily mounted in a commercial motion stage while still allowing access to the spindle of the micrometer to actuate the micromanipulation device. For example, a suitable motion stage may be the Thorlabs PT1, which has a 25 mm dynamic range and a resolution of 20 μm. Using a motion stage enables stacking objects into 3-D geometries or placing objects in distinct positions on other devices or sensors.

Application of the Device to Manipulation of Micro-Particles

To demonstrate the basic application of the device, a micromanipulation device constructed according to the device 50 shown in FIG. 13 was used to grab and translate individual micro-particles of about 100 μm size. As test specimens, fine grains of common artificial sweetener were placed on the glass slide. The micro-manipulator assembly was translated rapidly and crudely using the translation stage until the device 50 reached the glass slide. From this point on, the operations were carried out under a microscope. Micrometer movements of the translation stage were made to align the tips 56 and gap g over a target micro-particle. The micrometer 70 of the apparatus 200 was then operated to close the tips 56 onto the micro-particle. The translation stage was then operated to lift the particle above the glass slide, then subsequently lowering the particle back down onto the slide, at which point the micrometer 70 is rotated counterclockwise to release the particle. Once the particle is released, the device elastically returns to its undeformed shape.

This demonstration shows that the micro-manipulation device 50 can successfully grip, translate and release individual micro-particles without mechanical failure. The deformation of the device is completely elastic since releasing of the actuation force returns it to its original un-deformed state. The actuation can be achieved entirely manually without the need for connection to any electrical or pneumatic power supplies. The device is completely re-usable since all of its components can be easily assembled and dismantled. If desired, the device 50 can be removed from the fixture and stored for future use. The entire apparatus 200 is completely portable and can be easily transported to a specific laboratory and mounted on a stationary surface, a translation stage or an electromechanical actuator.

In a further embodiment, the apparatus 200 can be integrated into a system for storing and/or treating micro-sized objects, particles or cells extracted by the micromanipulation device 50. Thus, as shown in FIGS. 22-23, a storage/treatment module 180 may be provided that is integrated with the micromanipulation apparatus 200. The module 180 may provide a support for the apparatus 200, or the apparatus 200 and module 180 may be supported on a separate structure. The storage/treatment module 180 may include a multi-well platter 182 that includes one or more wells 184 sized to receive a desired micro-sized object, such as tissue, cell clusters or an individual cell. The wells may contain chemicals or biological substances that can treat, functionalize, fix or preserve the object. The module 180 may be provided with translation controls 186 that can move the platter 182 in three directions beneath the device 50. Thus, as shown in FIG. 23, the platter 182 may be translated until a selected well is directly beneath a particle P being held by the device 50. The translation controls 186 can be used to raise the platter so that the selected well is immediately beneath the particle, after which the apparatus 200 is operated to release the particle into the well 184. The platter may be manipulated to position successive wells to receive multiple objects. The controls 186 may be operated to lower the platter 182 and to withdraw the platter into a component 188, which can be configured to store the platter with all of the wells 184 filled with micro-particles. The component may also be configured to permit some treatment of the extracted particle or particles. In this instance, the platter may be returned to its position beneath the micromanipulation device and the device 50 operated to withdraw the particle from the well.

When used in conjunction with a motion stage, such as the Thorlabs PT1 apparatus described above, the individual micro-sized objects or particles can be individually treated and then collectively combined. For instance, multiple objects can be stacked to create 3-D geometries. As each new object or particle is added to the stack it can be treated with a substance to improve the adherence of the particle to the stack, to thereby improve he structural integrity of the 3-D geometry.

In another example of use of the apparatus 200 in conjunction with a motion stage, an individual microparticle may be grasped by the micromanipulation device, and then the entire apparatus moved by the motion stage to another device, such as a cantilever mass sensor. It is known that a cantilever mass sensor requires the particle(s) being weighed to be at the tip of the sensor for maximum sensitivity. The motion stage can accurately position the tip of the micromanipulation device at the tip of the mass sensor and then the micromanipulation device can be actuated to drop the particle onto the sensor. Multiple microparticles can be deposited on the mass sensor in the same manner to determine a combined weight.

In yet another embodiment, the apparatus 200 may be modified to incorporate a force-feedback system, or more specifically a system that can provide information about the forces experiences at the tips 56 of the micromanipulation device 50. For example, a micro-sized strain gage may be attached to the outer surface of the arms 55 to measure the strain as the arms are deflected. Appropriate circuitry can generate stress and force data from the measured strain and provide an output to the user. The force data can be used to ensure that the gripping force generated by the device does not exceed a force that could rupture the particle being manipulated or the yield strength of the arms of the device itself.

Applications of the Micromanipulation Apparatus Interrogation of Single Cell Behavior Understanding of how cells respond to stimuli is extremely important in biology and medicine. Currently these studies are performed on a large number of cells, because the tools to stimulate and manipulate single cells are limited. The ability of stimulating individual cells and observing their response is of paramount importance for understanding of diseases like cancer. In this complex disease, individual cells not only undergo detrimental modifications but also recruit healthy cells into the malignant state. The apparatus and device described herein can be used to bring a healthy cell in contact with a malignant cell to study the interactions between the two cells (with further imaging techniques such as fluorescence microscopy).

Study of Cell Behavior Under Mechanical Stress

It is also known that cell biology can be altered by external forces. In fact, this phenomenon is a formal research topic among medical researchers who are actively trying to understand numerous diseases including malaria. Again, the present device can be used to apply a force to or squeeze individual cells and interrogate their response to external forces. In this instance, a force-feedback component may be desirable.

Infection of Single Cells with Viruses

This device can also be used to study infection of cells. Viral infections of cells is a profound research topic and is still not completely understood. The arms of the device can easily be loaded with viruses (such as by wetting it with a virus suspension) and then can be used to squeeze an individual cells to deliver the virus particles to its surface. The results of the infection can later on be investigated with imaging techniques.

Microcontact Printing of Discrete Micro-Sized Objects or Particles

Functionalization of microareas individually and discretely without contaminating neighboring areas can be achieved using the apparatus 200 described herein, particularly in conjunction with a motion stage. Discrete functionalization can eliminate wasting chemicals and can accurately locate and functionalize appropriate particles. For instance, a "micro-stamp" may be applied to discrete particles. In one example, polydimethylsiloxane (PDMS) is used as a stamp material to transfer "ink" to a target surface. The "ink" in the specific example is a fluorescein-isothiocyanate-labeled bovine serum albumin. The PDMS stamp is grasped by the apparatus 200 and brought into contact with specific beads in a multi-bead array. Using the motion stage, the apparatus can be moved so that the micromanipulation device holding the stamp applies slight pressure to the particle to affix the "ink".

Manipulation of Individual Live Cell Spheres

The ability to discriminate and move individual or groups of live cells within or outside of aqueous media can lead to arrangement of cells in specific patterns, placement of cells on sensors or isolation of individual cell spheres from a culture. The apparatus 200 can easily perform these functions. For instance, stem cells grow as multiple spheres in soft agar. Before the stem cells can be interrogated, multiple aspiration and incubation steps are used to separate all of the spheres from the viscous media, which is time-consuming and problematic since reagents typically cannot isolate a single sphere. Consequently, in traditional procedures many stem cell spheres are wasted that could otherwise remain in the media until needed. In one example, the apparatus 200 was able to isolate a single mouse prostate cell directly from the viscous media in which the cell was suspended. The gripping force provided by the micromanipulation device of the apparatus was strong enough to complete with the surface tension of the viscous gel but not so strong as to damage the cell.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A micromanipulation device for manipulating micro-sized objects, comprising:
    a handheld force generating device configured to fit in a palm of a user's hand including a macro-sized dimensional mechanism allowing said user to provide macro-sized dimensional adjustments;
    a micro-sized micromanipulation device including:
    a base;
    a pair of resiliently deflectable elongate arms projecting from said base, each arm having a tip disposed in opposition to each other and defining a gap therebetween; and
    a saddle attached to said tips of said arms and disposed between said arms, said saddle including a force transmission surface disposed toward said base, said saddle configured so that application of a force on said force transmission surface toward said base deflects said arms towards each other to reduce the gap therebetween; and
    a fixture interface coupled to said handheld force generating device and to said micro-sized micromanipulation device, said fixture interface including an adaptor configured to engage the saddle when the handheld force generating device moves away from the saddle and further configured to disengage from the saddle when the handheld force generating device moves towards the saddle to thereby translate said macro- dimensional adjustments of the handheld force generating device to micro-dimensional adjustments of said pair of resiliently deflectable elongated arms.

2. The micromanipulation device of claim 1, wherein said arms are curved from said base toward said tips of said arms.

3. The micromanipulation device of claim 2, wherein said arms are curved at a substantially constant radius.

4. The micromanipulation device of claim 3, wherein said pair of arms are attached to said base separated by a base length and said radius is greater than said length.

5. The micromanipulation device of claim 1, wherein said pair of arms are attached to said base separated by a base length that is greater than said gap.

6. The micromanipulation device of claim 1, wherein said saddle is attached to said tips of said arms by a corresponding a pair of prongs, said prongs extending toward said base.

7. The micromanipulation device of claim 6, wherein said saddle has a width between opposite ends thereof that is greater than said gap and said prongs extend between said tip of a corresponding arm and a corresponding opposite end of said saddle.

8. The micromanipulation device of claim 1, wherein at least said arms are formed of single crystal silicon.

9. The micromanipulation device of claim 1, wherein at least said arms have a thickness of between about 0.1 mm and 0.5 mm.

10. The micromanipulation device of claim 1, wherein said device is configured as a continuous frame including said base, said pair of arms and said saddle.

11. The micromanipulation device of claim 10, wherein said base further includes at least one tab projecting outward from said base, said tab configured to be manually grasped.

12. A micromanipulation apparatus for manipulating micro-sized objects, comprising:
    a micromanipulation device including;
    a base;
    a pair of resiliently deflectable arms projecting from said base, each arm having a tip disposed in opposition to each other and defining a gap therebetween; and
    a saddle attached to said tips of said arms and disposed between said arms, said saddle including a force transmission surface disposed toward said base, said saddle configured so that application of a force on said force transmission surface toward said base deflects said arms towards each other to reduce the gap therebetween; and a force generating device connected to said base and including a force member coupled to said saddle at said force transmission surface, said force generating device operable to displace said force member to apply a force on said force transmission surface in the direction of said base;

a fixture having a first portion supporting said micromanipulation device and a second portion supporting said force generating device with said force member coupled to said saddle, wherein said micromanipulation device includes a pair of tabs extending from opposite sides of said saddle, said first portion of said fixture includes a pair of channels configured to removably receive a corresponding one of said tabs when said micromanipulation device is supported in said first portion, and wherein said first portion includes a clamp for clamping said tabs within said channels.

13. The micromanipulation apparatus of claim 12, wherein said force generating device is a micrometer and said force member is a spindle of said micrometer.

14. The micromanipulation apparatus of claim 12, wherein:
said force generating device is a micrometer and said force member is a spindle of said micrometer; and
said second portion of said fixture includes an annular collar sized to receive said micrometer therein so that the micrometer can be manually operated with said spindle coupled to said saddle.

15. The micromanipulation apparatus of claim 14, wherein:
said spindle is elongated and said micrometer is configured to extend and retract said spindle along the longitudinal axis of said spindle; and
said fixture is configured so that said saddle of said micromanipulation device is aligned with the longitudinal axis of said spindle.

16. The micromanipulation apparatus of claim 14, wherein:
said spindle is elongated and said micrometer is configured to extend and retract said spindle along the longitudinal axis of said spindle; and
said force generating device includes an adaptor coupled between said spindle and said force transmission surface of said saddle.

17. The micromanipulation apparatus of claim 16, wherein:
said force transmission surface faces said tips of said arms; and
said adaptor includes a post disposed between said force transmission surface and said tips of said arms, said post configured to bear on said force transmission surface.

18. The micromanipulation apparatus of claim 12, wherein:
said force transmission surface faces said base; and
said force member is fastened to said force transmission surface.

19. The micromanipulation apparatus of claim 12, further comprising a collection device supported on said fixture and including at least one well configured to receive a micro-sized object grasped and released by said micromanipulation device.

20. The micromanipulation apparatus of claim 19, wherein said collection device is movably supported on said fixture to be moved to and from a position in which said at least one well is aligned with the tips of said arms of said micromanipulation device.

21. The micromanipulation apparatus of claim 20, wherein said collection device includes a plurality of wells and is movably supported on said fixture to selectively move a selected one of said wells to and from a position aligned with the tips of said arms of said micromanipulation device.

22. The micromanipulation apparatus of claim 20, wherein said collection device is movably supported on said fixture so that said at least one well can be moved to a position in which a micro-sized object in said well can be treated.

23. A micromanipulation apparatus for manipulating micro-sized objects, comprising:
a micromanipulation device including;
a base;
a pair of resiliently deflectable arms projecting from said base, each arm having a tip disposed in opposition to each other and defining a gap therebetween; and
a saddle attached to said tips of said arms and disposed between said arms, said saddle including a force transmission surface disposed toward said base, said saddle configured so that application of a force on said force transmission surface toward said base deflects said arms towards each other to reduce the gap therebetween; and a force generating device coupled to said base and including a force member coupled to said saddle at said force transmission surface, said force generating device operable to displace said force member to apply a force on said force transmission surface in the direction of said base;

a fixture having a first portion supporting said micromanipulation device and a second portion supporting said force generating device with said force member coupled to said saddle, wherein said micromanipulation device includes a pair of tabs extending from opposite sides of said saddle, and wherein said first portion includes a clamp for clamping said tabs to said first portion of said fixture.

24. The micromanipulation apparatus of claim 23, wherein said force generating device is a micrometer and said force member is a spindle of said micrometer.

25. The micromanipulation apparatus of claim 23, wherein:
said force generating device is a micrometer and said force member is a spindle of said micrometer; and
said second portion of said fixture includes an annular collar sized to receive said micrometer therein so that the micrometer can be manually operated with said spindle coupled to said saddle.

26. The micromanipulation apparatus of claim 25, wherein:
said spindle is elongated and said micrometer is configured to extend and retract said spindle along the longitudinal axis of said spindle; and
said fixture is configured so that said saddle of said micromanipulation device is aligned with the longitudinal axis of said spindle.

27. The micromanipulation apparatus of claim 26, wherein:
said spindle is elongated and said micrometer is configured to extend and retract said spindle along the longitudinal axis of said spindle; and
said force generating device includes an adaptor coupled between said spindle and said force transmission surface of said saddle.

28. The micromanipulation apparatus of claim 27, wherein:
said force transmission surface faces said tips of said arms; and
said adaptor includes a post disposed between said force transmission surface and said tips of said arms, said post configured to bear on said force transmission surface.

29. The micromanipulation apparatus of claim 23, wherein:
said force transmission surface faces said base; and
said force member is fastened to said force transmission surface.

30. The micromanipulation apparatus of claim 23, further comprising a collection device supported on said fixture and including at least one well configured to receive a micro-sized object grasped and released by said micromanipulation device.

31. The micromanipulation apparatus of claim 30, wherein said collection device is movably supported on said fixture to be moved to and from a position in which said at least one well is aligned with the tips of said arms of said micromanipulation device.

32. The micromanipulation apparatus of claim 31, wherein said collection device includes a plurality of wells and is movably supported on said fixture to selectively move a selected one of said wells to and from a position aligned with the tips of said arms of said micromanipulation device.

33. The micromanipulation apparatus of claim 31, wherein said collection device is movably supported on said fixture so that said at least one well can be moved to a position in which a micro-sized object in said well can be treated.

34. A micromanipulation device for manipulating micro-sized objects, comprising:
a handheld force generating device configured to fit in a palm of a user's hand including a macro-sized dimensional mechanism allowing said user to provide macro-sized dimensional adjustments;
a micro-sized micromanipulation device including:
a base;
a pair of resiliently deflectable elongate arms projecting from said base, each arm having a tip disposed in opposition to each other and defining a gap therebetween; and
a saddle attached to said tips of said arms and disposed between said arms, said saddle including a force transmission surface disposed toward said base, said saddle configured so that application of a force on said force transmission surface toward said base deflects said arms towards each other to reduce the gap therebetween; and
a fixture interface coupled to said handheld force generating device and to said micro-sized micromanipulation device, said fixture interface configured to translate said macro-dimensional adjustments of the handheld force generating device on a first axis to movement of the saddle on a second axis offset from the first axis resulting in micro-dimensional adjustments of said pair of resiliently deflectable elongated arms.

* * * * *